(12) United States Patent
Abe et al.

(10) Patent No.: US 8,332,753 B2
(45) Date of Patent: Dec. 11, 2012

(54) INFORMATION DISPLAYING APPARATUS WITH WORD SEARCHING FUNCTION AND RECORDING MEDIUM

(75) Inventors: Takatoshi Abe, Hamura (JP); Takashi Kojo, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 671 days.

(21) Appl. No.: 12/431,678

(22) Filed: Apr. 28, 2009

(65) Prior Publication Data

US 2009/0228787 A1    Sep. 10, 2009

Related U.S. Application Data

(63) Continuation of application No. 10/725,989, filed on Dec. 1, 2003, now abandoned.

(30) Foreign Application Priority Data

Oct. 31, 2002 (JP) ................. 2002-317868
Oct. 31, 2002 (JP) ................. 2002-317869

(51) Int. Cl.
*G06F 17/00* (2006.01)
(52) U.S. Cl. ..................... 715/259; 715/260
(58) Field of Classification Search .......... 715/259, 715/260, 255, 200
See application file for complete search history.

(56) References Cited

U.S. PATENT DOCUMENTS

| | | | |
|---|---|---|---|
| 5,280,573 A | 1/1994 | Kuga et al. |
| 5,634,051 A | 5/1997 | Thomson |
| 5,745,776 A | 4/1998 | Sheppard, II |
| 5,974,370 A | 10/1999 | Suda et al. |
| 6,012,053 A | 1/2000 | Pant et al. |
| 6,128,635 A | 10/2000 | Ikeno |
| 6,154,214 A | 11/2000 | Uyehara et al. |
| 6,301,576 B1 | 10/2001 | Wolfe |
| 6,735,559 B1 | 5/2004 | Takazawa |
| 6,785,869 B1 | 8/2004 | Berstis |
| 6,961,722 B1 | 11/2005 | Bruecken |
| 7,124,364 B2 | 10/2006 | Rust et al. |
| 7,137,076 B2 | 11/2006 | Iwema et al. |
| 2002/0143739 A1 | 10/2002 | Makino et al. |
| 2002/0194166 A1 | 12/2002 | Fowler |

(Continued)

FOREIGN PATENT DOCUMENTS

GB         2336694 A    10/1999
(Continued)

OTHER PUBLICATIONS

Franklin, Merriam-Webster's Collegiate Dictionary (11th Edition) SCD-1870 Users Guide, 2003. Franklin, pp. 1-76.

(Continued)

*Primary Examiner* — Manglesh M Patel
(74) *Attorney, Agent, or Firm* — Holtz, Holtz, Goodman & Chick, PC

(57) ABSTRACT

Plural headwords corresponding to a search character string are searched for through a dictionary-content data memory and displayed in a list form in a left area of a display screen, and heading data included in explanation contents concerning the headwords are read out from a headword table to be displayed in a right area of the display screen. When a headword is designated from among the plural headwords displayed in list form in the left area of the display screen, heading data contained in plural explanation contents concerning the designated headword are read out from an explanation data table and are displayed in list form over the heading data displayed in the right area.

14 Claims, 19 Drawing Sheets

U.S. PATENT DOCUMENTS

2004/0210435 A1  10/2004  Oshima

FOREIGN PATENT DOCUMENTS

| | | |
|---|---|---|
| JP | 3-232063 A | 10/1991 |
| JP | 7-85058 A | 3/1995 |
| JP | 8-235181 A | 9/1996 |
| JP | 09-91314 A | 4/1997 |
| JP | 11-161650 A | 6/1999 |
| JP | 2001-134567 A | 5/2001 |
| JP | 2001-134568 A | 5/2001 |
| JP | 2001-134569 A | 5/2001 |

OTHER PUBLICATIONS

"WordNet, An Electronic Lexical Database," Fellbaum, Editor. The MIT Press, 1998, Chapter 4, pp. 103-127, and Chapter 15, pp. 353-377, with Title page and copyright page.

Hart, et al. "Query-free Information Retrieval," IEEE Expert, 1997.

Fig. 2

HEADWORD TABLE (12b)

| INDEX NUMBER | HEADWORD | ADDRESS | HEADING DATA |
|---|---|---|---|
| 1 | a | 2000 | A,a [エイ] [名] (アルファ |
| 2 | able | 2052 | (「すぐに使える状態にし |
| ... | ......... | .... | ......... |
| ... | ......... | .... | ......... |
| 245 | kind1 | 14125 | (「生まれ[性質](を同 |
| 246 | kind2 | 15035 | (「生まれのよい」が原 |
| ... | ......... | .... | ......... |

Fig. 3

EXPLANATION DATA TABLE (12c)

| INDEX NUMBER | EXPLANATION NUMBER | HEADING DATA | ADDRESS |
|---|---|---|---|
| 245 | 1 | [A] (「生まれ[性質](を同じ | 14125 |
| 245 | 2 | [B] [名]1[C]a種類(類sort | 14150 |
| 245 | 3 | [C]b (生物の)類,族(race) | .... |
| 245 | 4 | [D] (外形,程度などに対する | .... |
| 245 | 5 | [E]2a[the～]特定の種類[ | 14325 |
| 245 | 6 | [F] b[one's](人の)性に合 | 14500 |
| ... | ... | ......... | .... |
|  | 9 | [I] kind of | .... |

Fig. 4

CORRESPONDENCE-DATA TABLE (12g)

| INDEX NUMBER | EXPLANATION NUMBER | REFERENCE |
|---|---|---|
| 245 | 1 | — |
| 245 | 2 | — |
| 245 | 3 | — |
| 245 | 4 | ◎EXAMPLE |
| 245 | 5 | ◎PHRASE |
| 245 | 6 | — |
| ... |  | — |
|  | 9 | ◎PHRASE |

Fig. 9A

```
ABC ENGLISH JAPANESE DICTIONARY
[A] * kind1            [A](「生まれのよい」が原
[B] * kind2            [B] [形] 1a [S] 〈人が〉性格
                       [C] b(人、物、事に)寛大な
                       [D] c(限定)(伝言、手紙など
                       [E] 2(天候などが)快適な
[F] * kin・dle
[G] * kin・dling       ・・・・・
[H] * kind・ly         [→kind²]
[I] * kind・ness       [→kind²]
[J] * kind・ness       [→kind] 名
```

- 31a, 31b, 34 label items [A], [B]
- 33a, 35, 33b, 33c, 36 label right-pane items
- 31h, 31i, 31j label [H], [I], [J]
- 32h, 32i, 32j label right-side entries
- G2(18)

Fig. 9B

```
ABC ENGLISH JAPANESE DICTIONARY
* kind2 【「生まれのよい」が原義】派kind1
[形] 1a [S] 〈人が〉(性格的に)親切な(kindhe
a-rted);〈行為が〉親切な ;[D]〈人が動物に〉親
切にする、優しい、思いやりのある、[to](←→
unkind);[ S is kind to do / it is kind of
S to do so ] ・・・・・・・・・・・・・・
・・・・・・・・・・・・・・・・・・・・・
・・・・・・・・・・・・・・・・・・・・・
                  38
```

G3(18)

138 (DISPLAY IN RED, IN BOLD)

INFORMATION DISPLAYING APPARATUS WITH WORD SEARCHING FUNCTION AND RECORDING MEDIUM

The present application is a Continuation Application of U.S. application Ser. No. 10/725,989 filed Dec. 1, 2003, which is incorporated herein by reference.

BACKGROUND OF THE INVENTION

1. Field of the Invention

The present invention relates to an information displaying apparatus such as an electronic dictionary and to a computer program for displaying explanation information concerning a headword.

2. Description of the Related Art

An electronic dictionary has been in practical use, in which, when a user enters a word that he/she wants to learn the meaning of, so as to input an instruction to search for the word, the word is searched for through explanation contents previously stored therein, and the explanation content concerning the word is read out and displayed.

Another electronic dictionary is also in practical use, in which when the user enters a desired word, headwords which coincide with the entered word and similar words are displayed in list form, and when the user selects his/her desired word among the plural headwords or similar words displayed in list form, a display screen is switched to display the explanation content concerning the selected word, allowing the user to learn the appropriate meaning of his/her desired word.

Moreover, an electronic dictionary has been proposed which has a list display area and a preview display area for a headword, and which displays in the list display area a list of candidate headwords for entered characters and simultaneously displays information corresponding to a word selected with a cursor among the list of candidate headwords.

Further, an electronic dictionary has been put to practical use, in which, when the user enters his/her desired word, headwords which coincide with the entered word and words similar to the entered words are displayed in list form, and when the user's desired word is selected among the plural headwords or similar words displayed in list form, a display screen is switched to display the explanation content concerning the selected word, allowing the user to learn the appropriate meaning of his/her desired word.

Another electronic dictionary has been in practical use, in which search characters consisting of plural words (not a single word) are searched for, and an electronic dictionary is put to practical use, in which a data base specialized in phrases is prepared, and search characters consisting of plural words are searched for through the specialized data base.

To search for a phrase, a dictionary having a data base specialized in phrases is used, or a word is searched for in such a data base and the user learns the phrase from an example sentence contained in the explanation content concerning the word.

In the conventional dictionaries set forth above, since the whole explanation content concerning the selected keyword is displayed, the user is forced to read the explanation content from the very beginning until reaching desired appropriate explanation content, which requires troublesome work. Further, in the electronic dictionary which displays information of a headword selected with the cursor for a previewing purpose as described above, the user is required to read the explanation content from the beginning until reaching desired appropriate explanation content.

Some electronic dictionaries display plural explanation contents of the selected headword, but the explanation contents to be displayed are changed every time another headword is selected among those displayed in list form. Therefore, when the appropriate content is not contained in the currently displayed explanation contents, the user is required to make a time consuming manipulation to change the displayed explanation contents to obtain appropriate information.

In searching for a phrase though a specialized dictionary prepared for searching for a phrase, a phrase such as "word+a preposition" having a special meaning may be searched or found, but a phrase of "word+a preposition" having a normal meaning is not often found in such a specialized dictionary.

As described above, it will be difficult for a beginner to determine which dictionary is suitable for the user to search for a series of words.

For example, when the beginner thinks the search characters to be searched for are "word+a preposition", but the search characters actually are "word+infinitive", it will be difficult for the beginner to find correct meanings of such search characters.

Further, in searching for a phrase though the dictionary specialized in phrases, the meaning of the phrase to be searched for varies depending on a main word contained in such phrase.

As described above, even if the user uses any electronic dictionary, it is difficult for the user to search for search characters consisting of plural words through the electronic dictionary to learn an appropriate meaning.

SUMMARY OF THE INVENTION

According to one aspect of the invention, an information display apparatus includes a display device and a storage storing explanation information concerning headwords. A searching unit searches for headwords stored in the storage. Plural headwords found by the searching unit are displayed in list form on the display device together with a part of explanation information concerning each of the found headwords. When any of the plural displayed headwords is designated, an explanation-information display control unit displays plural pieces of explanation information concerning the designated headword in list form over the displayed explanation information concerning each of the found headwords in an overlapping manner and such that the explanation information concerning the designated headword and the designated headword are associated with each other.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles and the scope of the invention.

FIG. 2 is a view showing a headword table 12b of the communication electronic-dictionary 10, in which table data are stored;

FIG. 3 is a view showing an explanation data table 12c of the communication electronic-dictionary 10, in which table data are stored;

FIG. 4 is a view showing a correspondence-data table 12g of the communication electronic-dictionary 10, in which table data are stored;

FIGS. 9A and 9B are views illustrating display screens in the information displaying procedure in the dictionary search operation of the communication electronic-dictionary 10;

DETAILED DESCRIPTION OF THE PREFERRED EMBODIMENTS

Now, preferred embodiments of the present invention will be described with reference to the accompanying drawings.

Figure 1:
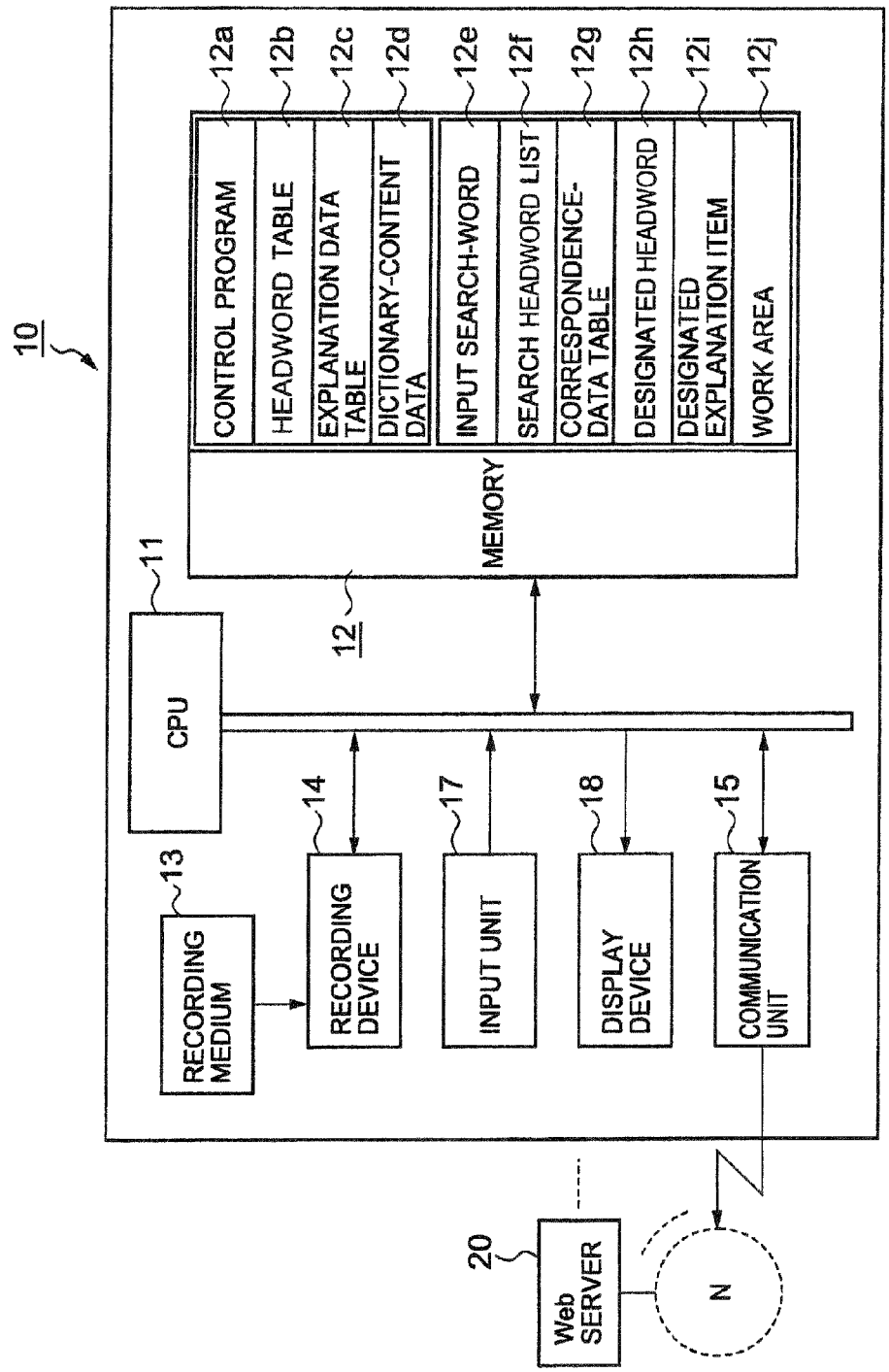
FIG. 1 is a block diagram illustrating an electronic circuit configuration of an electronic dictionary with a communication function (communication electronic-dictionary) 10, that is, an information displaying apparatus according to embodiments of the present invention.

FIG. 1 is a block diagram showing a configuration of an information display apparatus according to an embodiment of the present invention, that is, a configuration of an electronic circuit of an electronic dictionary 10 with a communication function.

The electronic dictionary 10 with a communication function comprises a computer, which operates under control of a program stored in various recording media, or under control of a program transferred externally. The computer is provided with an electronic circuit including a central processing unit (CPU) 11.

The CPU 11 serves to control operations of various circuits in accordance with instructions of a control program such as an electronic-dictionary control program previously stored in a memory 12, an electronic-dictionary control program read out from an external recording medium 13 such as a ROM card and stored in a recording device 14, and an electronic-dictionary control program read into the memory 12 from a Web server (a program server) 20 on the Internet N via a communication unit 15. The electronic-dictionary control program stored in the memory 12 is activated by an input signal responding to a user's operation performed on an input unit 17 including keys and a touch panel, or by a communication signal for communicating with the Web server 20 on the Internet N connected via the communication unit 15.

The CPU 11 is connected with the memory 12, the recording device (or a recording medium reading unit) 14, the communication unit 15, and the input unit 17, and is further connected with a display device 18 including a liquid crystal display unit (LCD).

The memory 12 of the electronic dictionary 10 with a communication function comprises a combination of ROM, Flash memory (EEP-ROM) and RAM.

In the memory 12 are stored a system program for controlling the whole operation of the electronic dictionary 10 with a communication function, a communication program for exchanging data with the Web server 20 on the Internet N via the communication unit 15, and the electronic-dictionary control program 12a for performing an information display procedure which is to be performed in a dictionary search. The memory 12 is provided with a headword table 12b, an explanation data table 12c, a dictionary-content data memory 12d, an input search-word memory 12e, a search headword list memory 12f, a correspondence-data table 12g, a designated headword memory 12h, a designated explanation item memory 12i, and a work area 12j.

FIG. 2 is a view showing the table data stored in the headword table 12b of the electronic dictionary 10. The headword table 12b stores a number of combination data each including an index number, a headword (an entry word), a storage address, and heading data of explanation data (the first several characters of explanation data) contained in a dictionary. The heading data includes a number of characters to the extent that a user can understand the meaning of the explanation data or to the extent that can be contained in a data list displayed on the display device 18 (refer to a display screen of a search headword list display screen G2, shown in FIG. 9A).

FIG. 3 is a view illustrating the table data stored in the explanation data table 12c of the electronic dictionary 10. The explanation data table 12c stores heading data (including the predetermined number of characters) of plural explanation items (explanation data) for each headword of various dictionaries stored in the dictionary content data memory 12d, together with the corresponding index number, explanation number, and storage address. The heading data of each explanation item includes the number of characters to the extent that the user can understand the meaning of the explanation data or to the extent that can be contained in a data list displayed on the display device 18 (refer to a display screen of a search headword list display screen G2, shown in FIG. 8B)

The dictionary-content data memory 12d stores databases to be retrieved or searched in accordance with the electronic-dictionary control program 12a, that is, contents of various kinds of dictionaries such as an English-Japanese Dictionary, a Japanese-English Dictionary, a Japanese Dictionary, an Encyclopedia, a Technical-Term Dictionary, Kojien (TM., Japanese dictionary), and a Katakana Dictionary (Japanese dictionary).

The input search-word memory 12e stores a series of characters to be retrieved or searched for (search character string) consisting of a word or a series of words entered in a dictionary search (the information display procedure).

The search headword list memory 12f stores searched headword list data, that is, all of the headwords which coincide with or include a search character string searched for in dictionary contents stored in the dictionary-content data memory 12d.

FIG. 4 is a view illustrating the correspondence-data table 12g of the electronic dictionary 10 with table data stored therein.

In a phrase-usage search procedure performed in the information displaying procedure in the dictionary search operation, when search characters stored in the input search-word memory 12e consist of a series of (plural) words, a main word (a keyword) in the series of words is searched for. When the keyword is located (in the stored headwords) and plural pieces of explanation content of the located headword include data of "~" and data of "S, V, O", the data of "~" and data of "V" are replaced with the keyword, and when the search characters consisting of the series of words are included in the plural pieces of explanation information in which data of "~" and data of "V" have been replaced with the keyword, an index number of the headword, and a number of the corresponding explanation content with a flag, an "example" mark, or a "phrase" mark added are stored in a correspondence-data table 12g. The flag indicates that corresponding data has been found, and the "example" mark and the "phrase" mark indicate that a related example sentence and a related phrase are explained the explanation information, respectively. The "example" mark is associated with the flag when a character string which coincides with the keyword of the series of words is contained in the middle of the explanation content, and the "phrase" mark is associated with the flag when a character string which coincides with the keyword of the series of words is contained at the head of the explanation content.

In other words, the index number and the number of the explanation content are indicated in the correspondence-data table 12g when a phrase which coincides with the search character string consisting of the series of words is contained in the explanation content or when an example sentence using the search character string consisting of the series of words is contained in the explanation content.

The designated headword memory 12h stores the number of the headword designated by the user in a list of headwords corresponding to the input search character string stored in the search headword list memory 12f.

The designated explanation item memory 12i stores the number of the explanation content (explanation item) designated by the user among the plural explanation contents corresponding to the headword designated by the user in the search headword list.

The work area 12j temporarily stores various data according to need, which are input to or output from the CPU 11 in various processing operations in the electronic dictionary 10.

Now, operation of the information display apparatus having the above-described configuration (the electronic dictionary with a communication function) 10 (hereafter, a "communication electronic-dictionary") in the first embodiment will be described.

Figure 5:
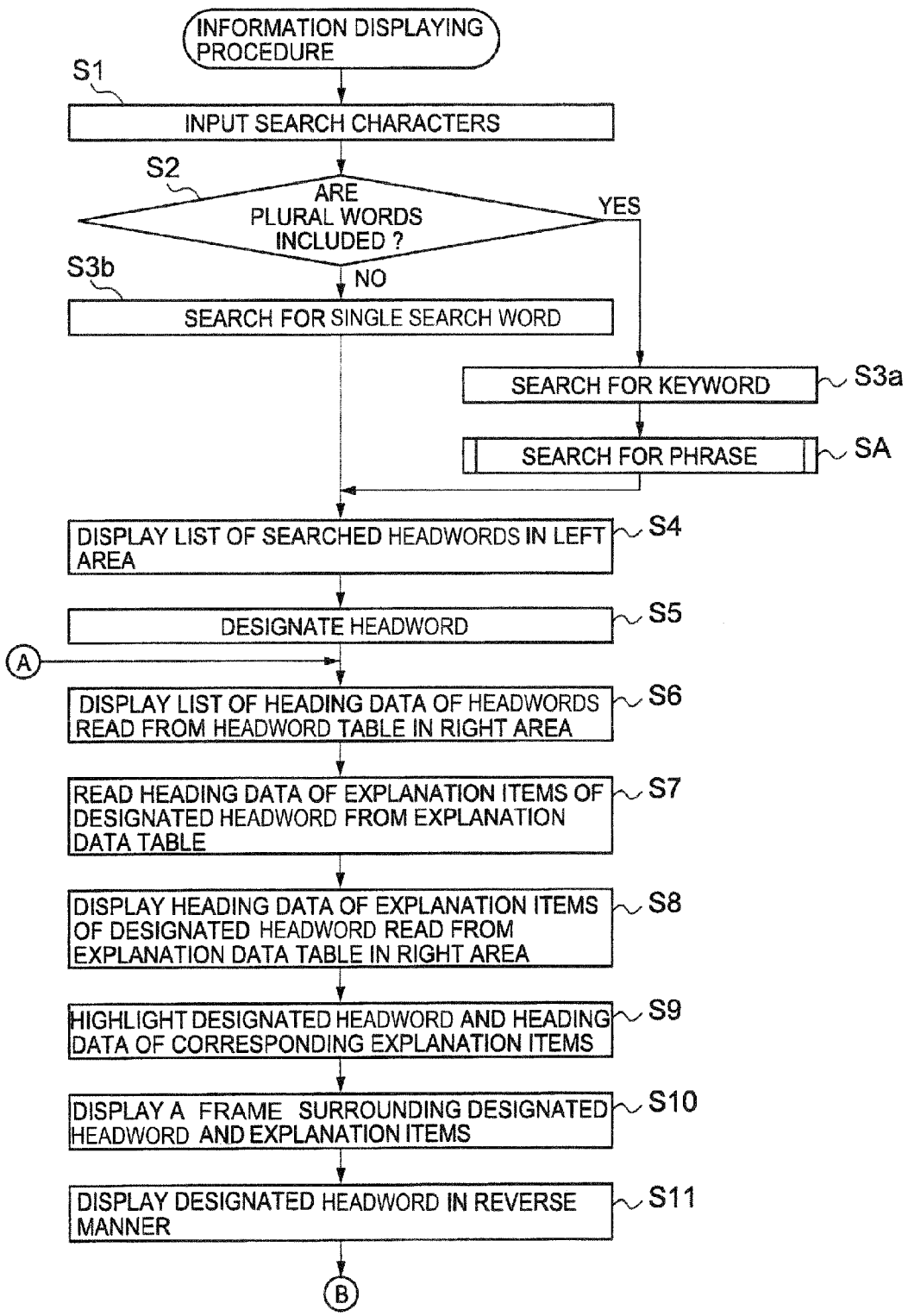
FIG. 5 is a flowchart showing an information displaying procedure performed in a dictionary search operation in the communication electronic-dictionary 10.

At first, a search mode is set by manipulation of an "English-Japanese" key in the input unit 17. When a search character string, for example, "kind to", is entered with a search-word input screen G1 (refer to FIG. 8A) displayed on the display device 18, and when a "translation/determination" key of the input unit 17 is manipulated, data of the entered search character string "kind to" is stored in the input search-word memory 12e at Step S1 in the information displaying procedure shown in FIG. 5.

It is judged at Step S2 whether or not the input search character string ("kind to") stored in the input search-word memory 12e includes plural words.

When it is determined at Step S2 that the input search word includes plural words such as "kind" and "to", a search is performed with respect to the keyword "kind" through dictionary data of an English-Japanese Dictionary stored in the dictionary-content data memory 12d, and plural headwords such as "kind1", "kind2", "kind• a , -• er", etc., which coincide with "kind" or include "kind" will be searched for and stored in the search headword list memory 12f at Step S3a. Then, the phrase-usage searching procedure begins at Step SA and is performed in accordance with the flow chart shown in FIG. 7.

Figure 7:
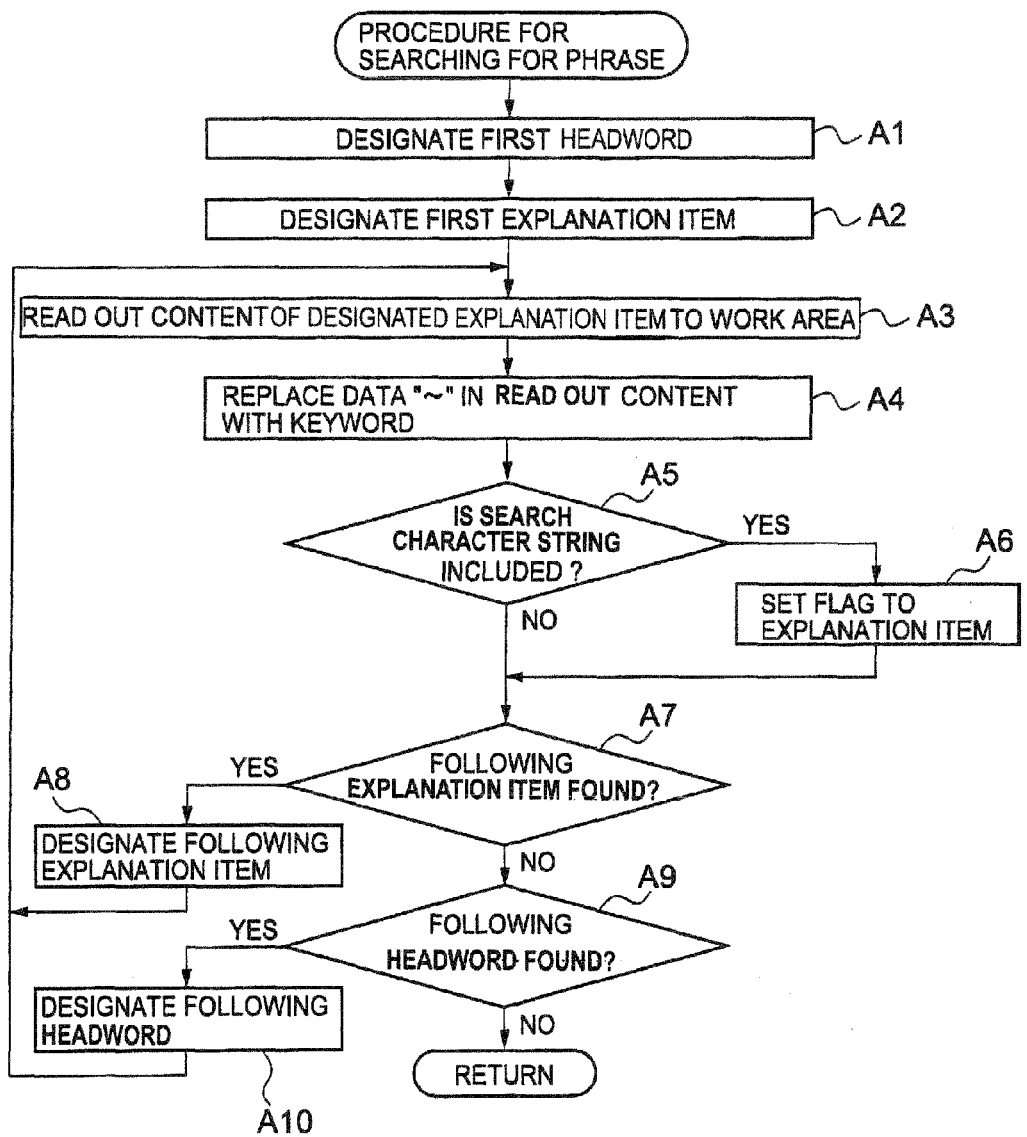
FIG. 7 is a flowchart showing a phrase-usage searching procedure performed in the information displaying procedure in the communication electronic-dictionary 10.

In the phrase-usage searching procedure shown in FIG. 7, at Step A1 the headword "kind1" is selected from among the plural headwords "kind1", "kind2", "kind-• a , -•er", etc., stored in the search headword list memory 12f, and then at Step A2 the first explanation item is designated in the plural explanation items corresponding to the selected headword.

Content data of the designated explanation item is read out to the work area 12j at Step A3, and data of "~" contained in the content data is replaced with the keyword "kind" at Step A4. At Step A5, it is judged whether or not a series of words of the content data with data of "~" replaced with the keyword "kind" coincide with or include the search character string, that is, "kind to", stored in the input search-word memory 12e. When it is determined at Step A5 that the series of words of the content data with data of "~" replaced with the keyword "kind" become a series of words coinciding with or including the search character string ("kind to"), a mark or a flag representing that the search character string has been found is set in the correspondence-data table 12g together with the corresponding index number and explanation number at Step A6.

When the result is NO at Step A5, that is, when it is determined at Step A5 that the series of words of the content data with data of "~" replaced with the keyword "kind" do not coincide with or include the search character string ("kind to"), or after Step A6 is performed, it is judged at Step A7 whether or not a following explanation item has been prepared in the explanation items corresponding to the designated headword "kind".

When it is determined at Step A7 that a following explanation item has been prepared, the following explanation item is designated at Step A8 and the procedure returns to Step A3 and the processes at Step A3 through Step A6 are performed with respect to the following explanation item.

As set forth above, in a first headword search for searching for the search character string "kind to", the first headword "kind1" is searched, and is stored in the search headword list memory 12f. Then, each explanation item for the first headword "kind1" is processed such that data of "~" included therein are replaced with the keyword "kind", and it is judged whether or not the resulting explanation item coincides with or includes the search character string "kind to". When the answer is YES, the mark or flag is set to the corresponding index number and the explanation number in the correspondence-data table 12g. Then, it is determined whether there is a following headword at Step A9, and if there is a following headword, the following headword (e.g., "kind2") stored in the search headword list memory 12f is designated at Step A10.

With respect to the following headword "kind2", in a similar manner to the first headword search for searching for the search character string "kind to", each explanation item for the headword "kind2" is processed such that data of "~" included therein are replaced with the keyword "kind", and it is judged whether or not the resulting explanation item coincides with or includes the search character string "kind to". When the answer is YES, the mark or flag is set to the corresponding index number and the explanation number in the correspondence-data table 12g. (FIG. 7: Step A3 through Step A8).

Figures 8A, 8B:
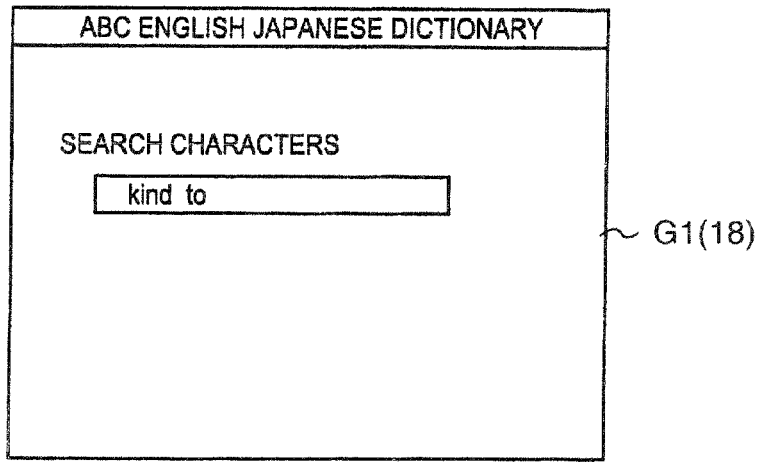
FIGS. 8A and 8B are views illustrating display screens in the information displaying procedure in the dictionary search operation of the communication electronic-dictionary 10.

When the phrase-usage search procedure for searching for the search character string consisting of plural words has finished with respect to each of the searched headwords, the searched-headwords "kind1" 31a, "kind2" 31b and "kind• a, -• er" 31c are written into a left side area of the search headword list display-screen G2 displayed on the display device 18 as shown in FIG. 8B. (FIG. 5: Step SA through Step S4).

Meanwhile, when it is determined at Step S2 (FIG. 5) that the input search-word stored in the input search-word memory 12e includes only a single word, the headword search is performed with respect to the single word through the dictionary data stored in the dictionary-content data memory 12d, and plural headwords 31a, 31b, etc., which coincide with or include the search word are searched for and stored in the search headword list memory 12f at Step S3b. As shown in FIG. 8B, these searched headwords 31a, 31b, etc., are written into the left area in the search headword list display-screen G2 displayed on the display device 18 to be shown in a list at Step S4.

The first headword 31a among the plural headwords 31a, 31b, etc., shown in a list in the left area of the search headword list display-screen G2 is designated and stored in the designated headword memory 12h at Step S5. The heading data (including several characters) of the respective explanation content for each of the plural headwords 31a, 31b, etc., shown in a list in the left area of the screen are read out from the headword table 12b shown in FIG. 2, and are shown in a list in a right area of the search headword list display-screen G2 so as to correspond respectively to the headwords 31a, 31b, etc., (see, for example, heading data 32h, 32i, 32j corresponding to headwords 31h, 31i, 31j, respectively, in FIG. 9A) at Step S6.

The heading data (the predetermined number of characters) 33a, 33b, etc., included in the explanation items for the designated headword 31a (for instance, headword: "kind1", index number: 245) stored in the designated headword memory 12h are read out from the explanation data table 12c shown in FIG. 3 at Step S7, and are displayed in a list in an overlapping manner on the respective heading data for the headwords 31a, 31b, etc., which have been displayed in the right area of the search headword list display-screen G2 as shown in FIG. 8B at Step S8.

Then, an explanation item (for instance, explanation item [E]) of the search character string "kind to", which item has corresponding data, is discerned in accordance with the flags set in the correspondence-data table 12g with respect to explanation items 33a, 33b, etc. (items [A], [B], [C], etc.), for the designated headword 31a (for instance, headword: "kind1", index number: 245), and is displayed in a highlighted manner 35 such as in red, in bold, or in a reversed manner, as shown in FIG. 8B at Step S9.

Then, a list display area including the designated headword 31a (for example, "kind1") and the heading data 33a, 33b, etc., included in the corresponding explanation items are surrounded by a frame (balloon) 36 (formed by a closed line that surrounds words therein) and displayed at Step S10. Further, the headword "kind1" 31a is displayed in the highlighted manner 34 at Step S11.

If all the heading data 33a, 33b, etc., included in the explanation items for the designated headword 31a cannot be displayed within the search headword list display screen G2, an opening portion 37 is provided in the displayed frame (balloon) 36 to indicate that there are additional explanation items which cannot be displayed within the frame (balloon) 36.

Figure 6:
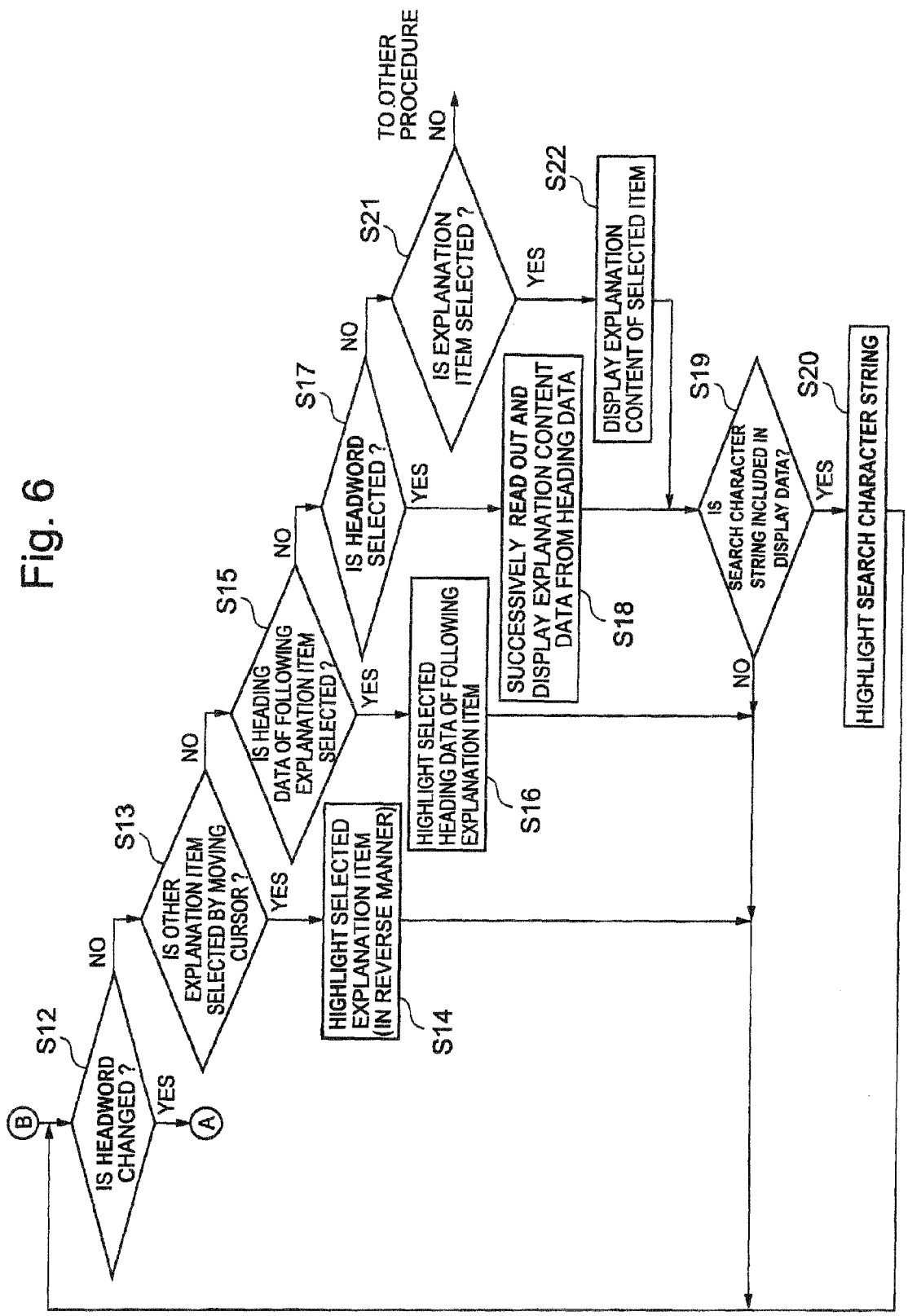
FIG. 6 is a continuation of the flowchart of FIG. 5.

When the designated headword among the headwords 31a, 31b, etc., displayed on the left area of the search headword list display screen G2 is changed from "kind1" 31a to "kind2" 31b by placing a cursor over "kind2" on the search headword list display screen G2 as shown in FIG. 9A at Step S12 (FIG. 6), the procedure returns to the process at S6, where the heading data included in the plural pieces of explanation content corresponding respectively to the headwords are displayed in a list. At Step S7 and Step S8, the heading data 33a, 33b, etc., included in plural explanation contents corresponding to the designated headword "kind2" 31b with the cursor placed thereon are displayed. The highlighting display 35 is performed at Step S9 to discriminate the heading data including the search character string from others, display of the frame (balloon) 36 is performed at Step S10, and the highlighting display 34 is performed to discriminate the designated headword from other headwords at Step S11, in a manner similar to the manner as set forth above with respect to the previously designated headword "kind1".

When a heading data is designated among the heading data 33a, 33b, etc., included in the explanation items corresponding to the designated headword by moving a cursor on the search headword list display-screen G2 at Step S13, the highlighting display 35 is performed with respect to the newly designated heading data, that is, the newly designated data is displayed in a reversed manner, at Step S14.

When a correspondence-data key (not shown) in the input unit 17 is manipulated at Step S15, the heading data of the following explanation item is displayed in a highlighted manner 35 at Step S16 in accordance with the explanation numbers of the search character string to which the flags are set in the correspondence-data table 12g.

When the "translation/determination" key of the input unit 17 is manipulated at Step S17 with the desired headword selected and displayed in the highlighting manner 34 in the search headword list display-screen G2, the explanation content of the selected headword stored in the dictionary-content data memory 12d is successively read out from the heading explanation item to display an explanation content display-screen G3 on the display device 18 as shown in FIG. 9B at Step S18.

When the search character string including plural words (for example, "kind to") is included in the content data of the explanation item corresponding to the designated headword on the explanation content display-screen G3, a block of data including the search character string, such as "S is kind to do", is displayed in another color, in highlighted characters or in another font (a search character-string highlighting display 38). (Step S19 and Step S20).

When the "translation/determination" key of the input unit 17 is manipulated at Step S21 with an explanation item selected from among the explanation items 33a, 33b, etc., by moving the cursor, and displayed in the highlighted manner 35 (Step S13, Step S14), or with an explanation item including the search character string selected by manipulation of the correspondence-data key and displayed (the highlighted display 35) (Step S15, Step S16), the explanation content corresponding to the selected explanation item is successively read out from the dictionary content data memory 12d to display the explanation content display-screen G3 on the display device 18 at Step S22.

When the search character string including plural words appears in content data after the explanation item corresponding to the designated explanation item displayed on the explanation content display-screen G3, a block of data including the search character string is displayed in another color, in highlighted characters or in another font (a search character string discerning display 38). (Step S19 and Step S20).

As described above, in the information displaying apparatus (communication electronic-dictionary) 10 of the configuration set forth above, plural headwords 31a, 31b, etc., corresponding to the input search character string are read out from the dictionary-content data memory 12d and are displayed in a list in the left area on the search headword list display-screen G2, and the heading data included in the explanation contents corresponding respectively to the headwords 31a, 31b, etc., are read out from the headword table 12b and are displayed in the right area on the search headword list display-screen G2. When a headword is selected from among the plural headwords 31a, 31b, etc., displayed in a list, the heading data 33a, 33b, etc., included in the plural explanation items corresponding to the selected headword are read out from the explanation data table 12c, and are displayed in a list in an overlapping manner in the right area on the search headword list display-screen G2 where the heading data included in the explanation contents corresponding to the headwords 31a, 31b, etc., are displayed. Therefore, when the user designates his/her desired headword while confirming the searched headwords 31a, 31b, etc., and the corresponding explanation contents, more detailed explanation contents 33a, 33b, etc., corresponding to the designated headword are displayed, and the user is allowed to directly find and confirm the appropriate headword corresponding to the input search character string and its detailed explanation contents 33a, 33b, etc.

Further, in the information displaying apparatus (communication electronic-dictionary) 10 of the configuration set forth above, the designated headword among the plural headwords 31a, 31b, etc., displayed in a list in the left area on the search headword list display-screen G2 and the heading data 33a, 33b, etc., for the explanation items corresponding to the designated headword displayed in a list in the right area are surrounded by the frame (balloon) 36 for easy confirmation of the headword and the explanation contents.

Furthermore, in the information displaying apparatus (communication electronic-dictionary) 10 of the configuration set forth above, if all the heading data 33a, 33b, etc., for the explanation items corresponding to the headword designated in the left area on the search headword list display screen G2 cannot be displayed on the same search headword list display screen G2, the frame (balloon) 36 is provided with an opening portion 37, by which the user can understand that the designated headword 31 has additional explanation items not displayed on the current display screen.

Further, in the information displaying apparatus (communication electronic-dictionary) 10 of the configuration set forth above, since the heading data extracted from the searched headwords 31a, 31b, etc., and the explanation data corresponding to the designated headword are prepared with the predetermined number of letters to the extent that the meanings thereof can be understood or to the extent that can be displayed within the search headword list display-screen G2, the user can understand the meanings of the explanation data, even if only the heading data are displayed.

In the information displaying apparatus (communication electronic-dictionary) 10 of the configuration set forth above, when the input search character string is a phrase including plural words, and further when the explanation contents corresponding to the searched headword include the character string including the plural words, the headword and the explanation content are displayed in a highlighted manner 35 such as in another color, in bold, or in another font. Therefore, the user can easily find the portion including the search character string or the phrase in the explanation contents.

Further, in the information displaying apparatus (the communication electronic-dictionary) 10 of the configuration set forth above, when the content data of the explanation items 33a, 33b, etc., corresponding to the designated headword 31 are displayed on the explanation content display-screen G3, and when the content data contains a searched-for phrase including plural words, the phrase included in the content data is displayed in the highlighted manner 38 such as in another color, in bold or in another font, which allows the user to find the portion including the phrase.

Now, an operation of the information displaying apparatus (the communication electronic-dictionary) 10 of the configuration set forth above according to a second embodiment of the invention will be described.

Figure 10:
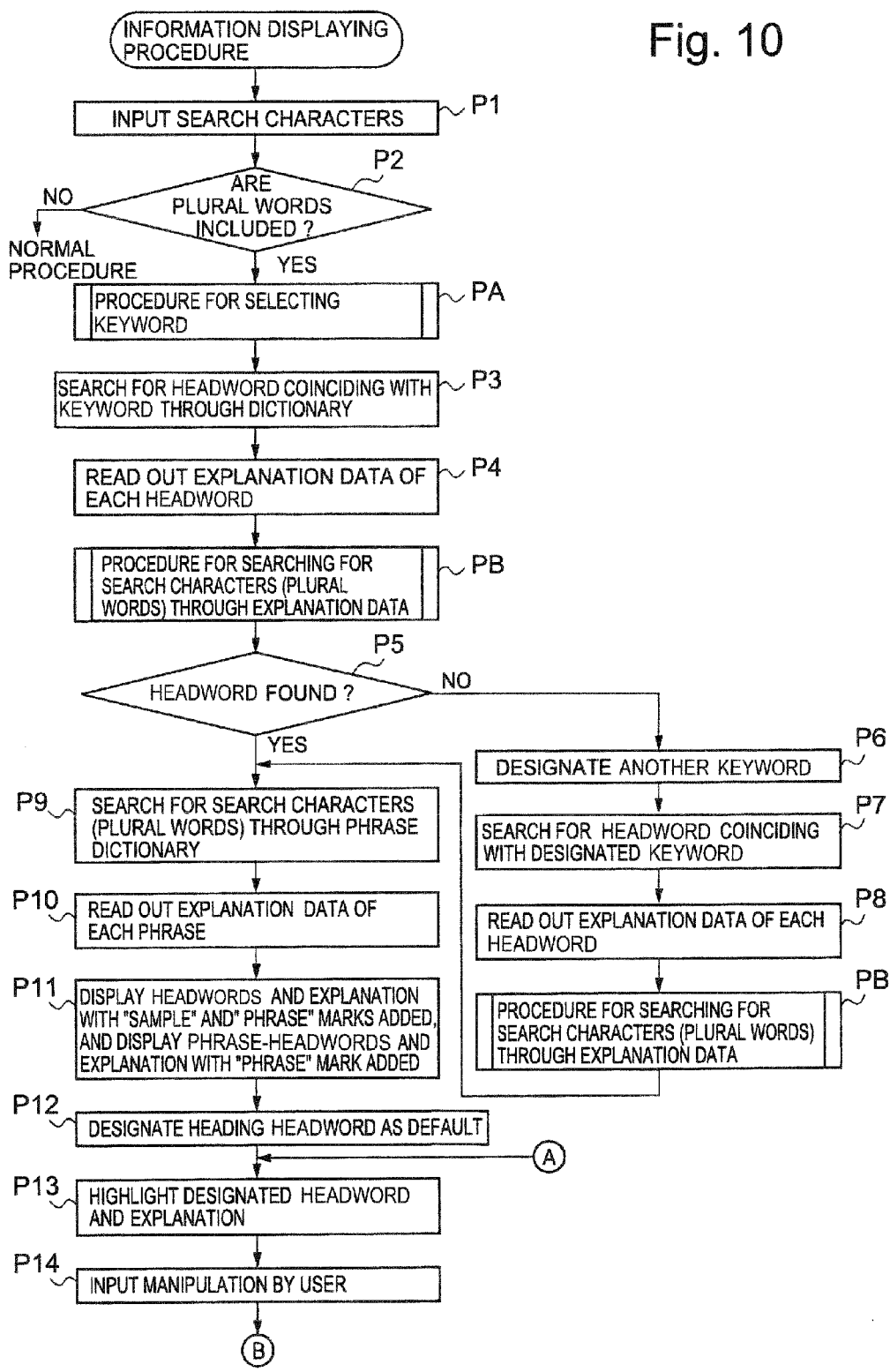
FIG. 10 is a flowchart showing an information displaying procedure performed in the dictionary search in the communication electronic-dictionary 10.
Figure 14A:
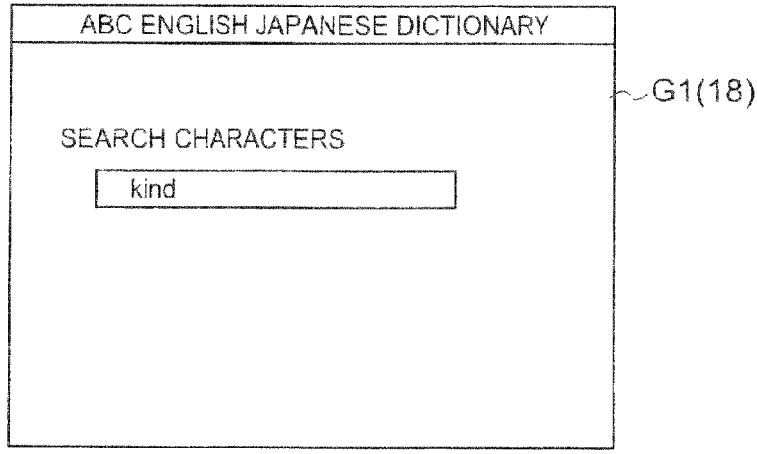
FIGS. 14A, 14B and 14C are views illustrating display screens displayed when a search character string consisting of one word is input in the information displaying procedure performed in the dictionary search operation of the communication electronic-dictionary 10.

For instance, when a search mode has been set in an English-Japanese dictionary in response to manipulation of an "English-Japanese" key of the input unit 17 and a search character string of "kind" is entered with the search-word input screen G1 displayed on the display device 18 as shown in FIG. 14A, and when the "translation/determination" key of the input unit 17 is manipulated, data related to the input search character string "kind" are stored in the input search-word memory 12e at Step P1 in FIG. 10.

At Step P2, it is judged whether the search character string "kind" stored in the input search-word memory 12e includes plural words or not. If it is determined at Step P2 that the input search word "kind" does not include plural words, the procedure goes to a normal dictionary search, where the input search word "kind" is searched through the dictionary-content database memory 12d, and headwords 131a, 131b which coincide with the input search word "kind" and headwords 131c, etc. which include the input search word "kind" are searched for and stored in the search headword list memory 12f. The headwords 131a, 131b, 131c, etc., are displayed in the left area of the search headword list display screen G4 displayed on the display device 18, as shown in FIG. 14B.

Figure 14B:
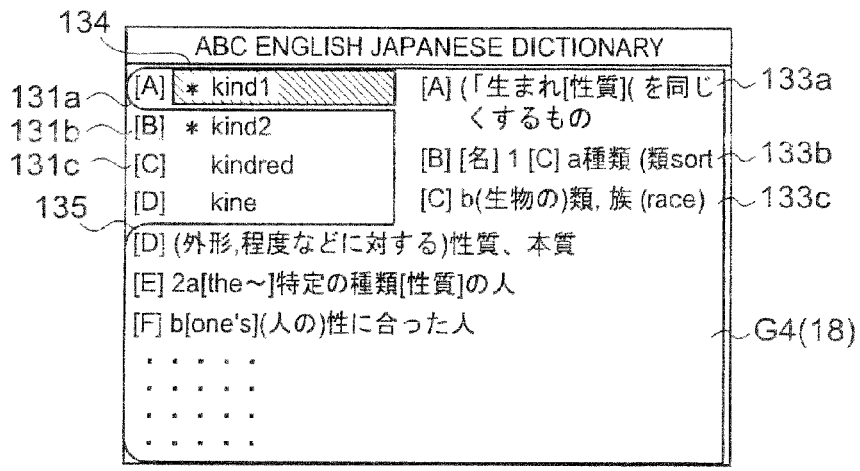
Figure 14C:
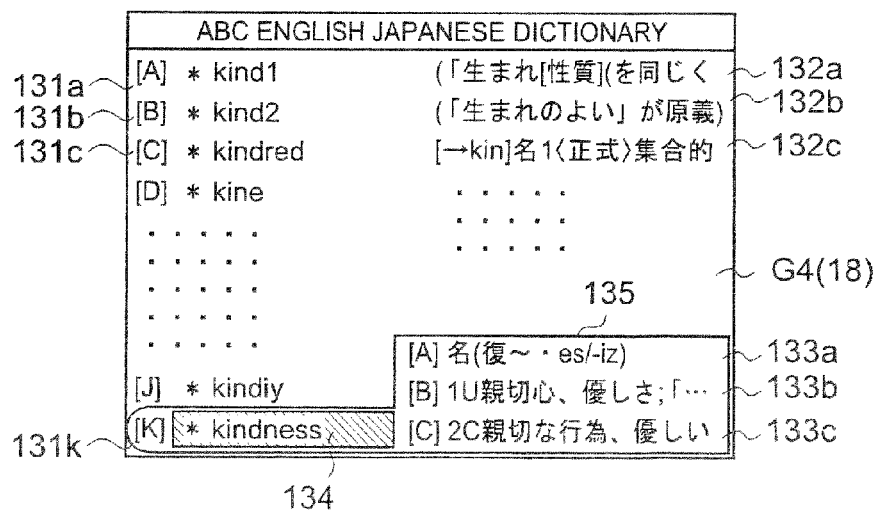

The heading data 132a, 132b, 132c, etc., included respectively in the explanation contents of the headwords 131a, 131b, 131c, etc., stored in the headword table 12b (FIG. 2) are displayed in a list in the right area of the search headword list display screen G4 so as to correspond respectively to the headwords 131a, 131b, 131c, etc., displayed in the left area of the search headword list display screen G4 (see FIG. 14C, for example).

Then, the first headword "kind1" is designated as a default word among the headwords 131a, 131b, etc., shown in a list in the search headword list display screen G4, and the designated headword "kind1" is highlighted at 134 as shown in FIG. 14B. The heading data 133a, 133b, 133c, etc., included in the explanation contents (items) of the designated headword "kind1" are read out from the explanation data table 12c (FIG. 3) and are displayed in a list over the heading data 132a, 132b, 132c, etc., of the respective headwords 131a, 131b, 131c, etc., in an overlapped manner, as shown in FIG. 14B. The highlighted designated headword "kind1" and the heading data 133a, 133b, etc., included in the corresponding explanation contents are surrounded by a frame (balloon) 135, which makes it clear that the headword "kind1" and the heading data 133a, 133b, etc., are related.

When the headword to be designated and highlighted is changed by manipulation of the cursor key of the input unit 17, the heading data 133a, 133b, etc., included in the explanation contents of the newly designated headword are read out and displayed with frame (balloon) 135 surrounding them, every time another headword (e.g., headword 131k) is designated as shown in FIG. 14C.

Figure 12:
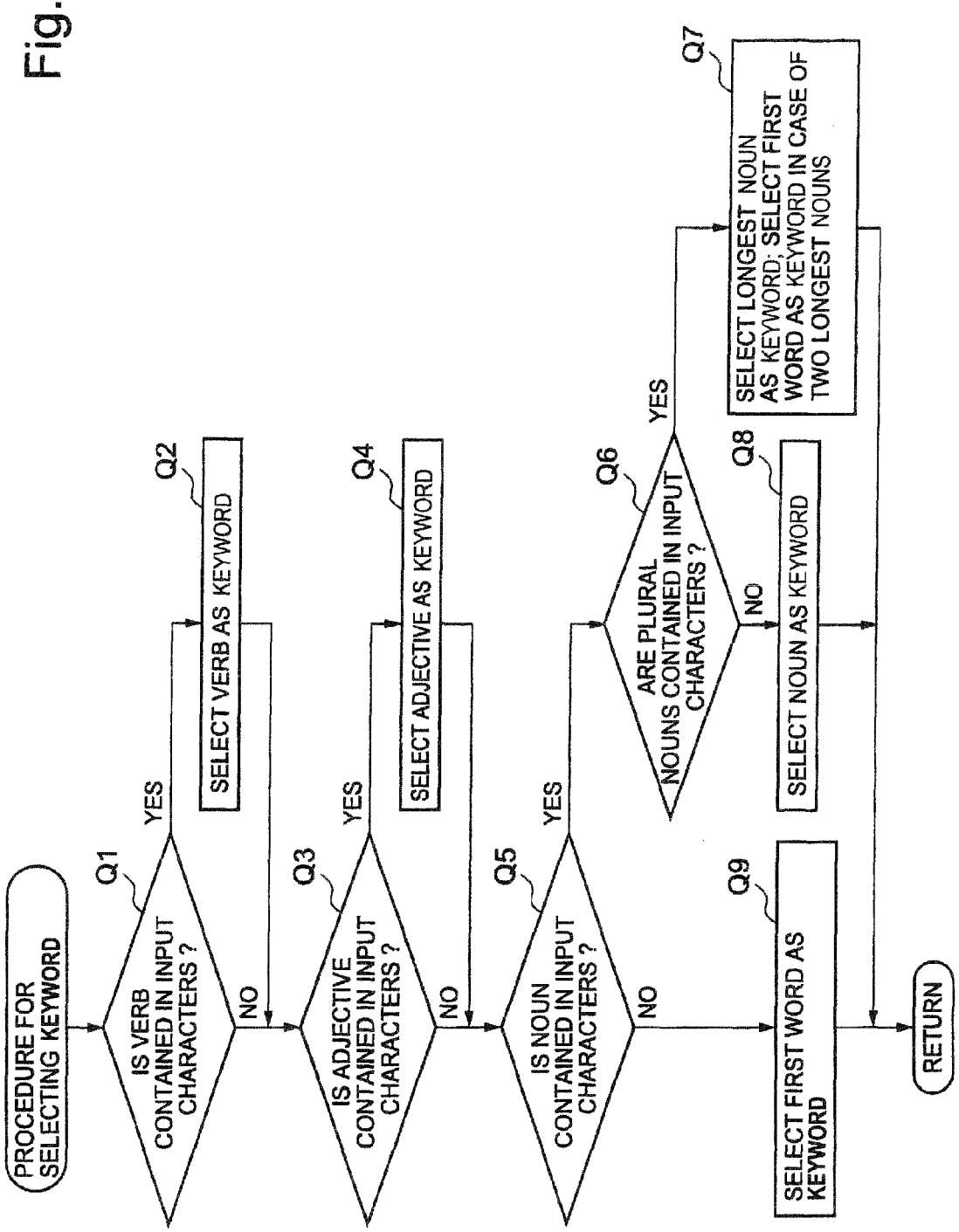
FIG. 12 is a flowchart of a keyword selecting procedure performed in the information displaying procedure of the communication electronic-dictionary 10.
Figure 15A:
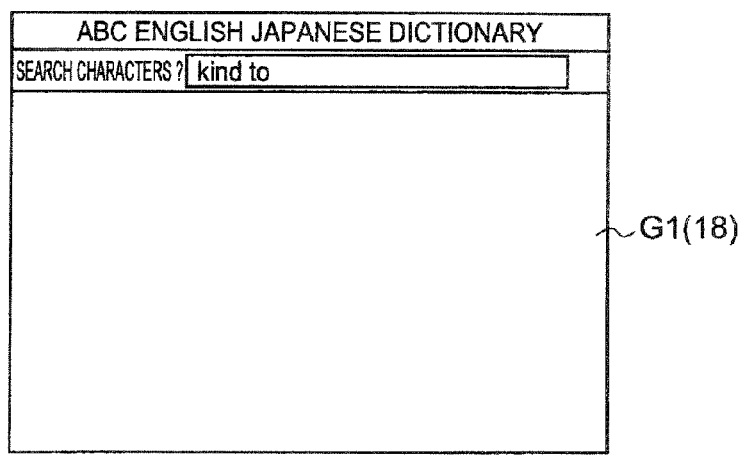
FIGS. 15A and 15B are views illustrating examples of display screens displayed when a search character string consisting of plural words is input in the information displaying procedure performed in the dictionary search operation of the communication electronic-dictionary 10.

Meanwhile, when, for instance, a search character string "kind to" is entered with the search-word input screen G1 displayed on the display device 18 and the cursor key is manipulated at Step P1 (FIG. 10), as shown in FIG. 15A, it is determined at Step S2 that the search character string includes plural words, and the procedure advances to a process at Step PA, where the keyword selecting procedure is performed in accordance with the flowchart shown in FIG. 12.

In the keyword selecting procedure PA, it is judged at Step Q1 whether the search character string includes a verb or not. If no verb is included, it is judged at Step Q3 whether the search character string includes an adjective or not. If no verb and no adjective are included, it is judged at Step Q5 whether the search character string includes a noun or not.

When it is determined at Step Q1 that the search character string includes a verb, the verb is designated as a main keyword to be searched at Step Q2. When it is determined that the search character string includes no verb, but includes an adjective, the adjective is designated as a keyword at Step Q4. Further, when it is determined that the search character string includes no adjective but includes a noun, then it is judged at Step Q6 whether the search character string includes plural nouns or not.

When it is determined at Step Q6 that the search character string includes plural nouns, the longest noun among the plural nouns is designated as a keyword at Step Q7. If plural nouns of the same length are included in the search character string, the first appearing noun is designated as a keyword. When the search character string does not include plural nouns but rather includes one noun, then the noun is designated as a keyword at Step Q8. When the search character string consisting of plural words includes no verb, no adjective, and no noun, the first appearing word in the plural words is designated as a main keyword to be searched at Step Q9.

With respect to the search character string consisting of plural words "kind to", the word "kind" is designated as the main keyword to be searched for.

When a word is designated as the main keyword to be searched for with respect to the search character string consisting of plural words at Step PA, the keyword ("kind" in this example) is searched through the headwords contained in an English-Japanese dictionary data stored in the dictionary-content data memory 12d. Headwords "kind1", "kind2", etc., which coincide with the keyword "kind" are searched for and stored in the search headword list memory 12f at Step P3 (FIG. 10), and the explanation contents corresponding to each of the searched headwords are read out at Step P4.

Figure 13:
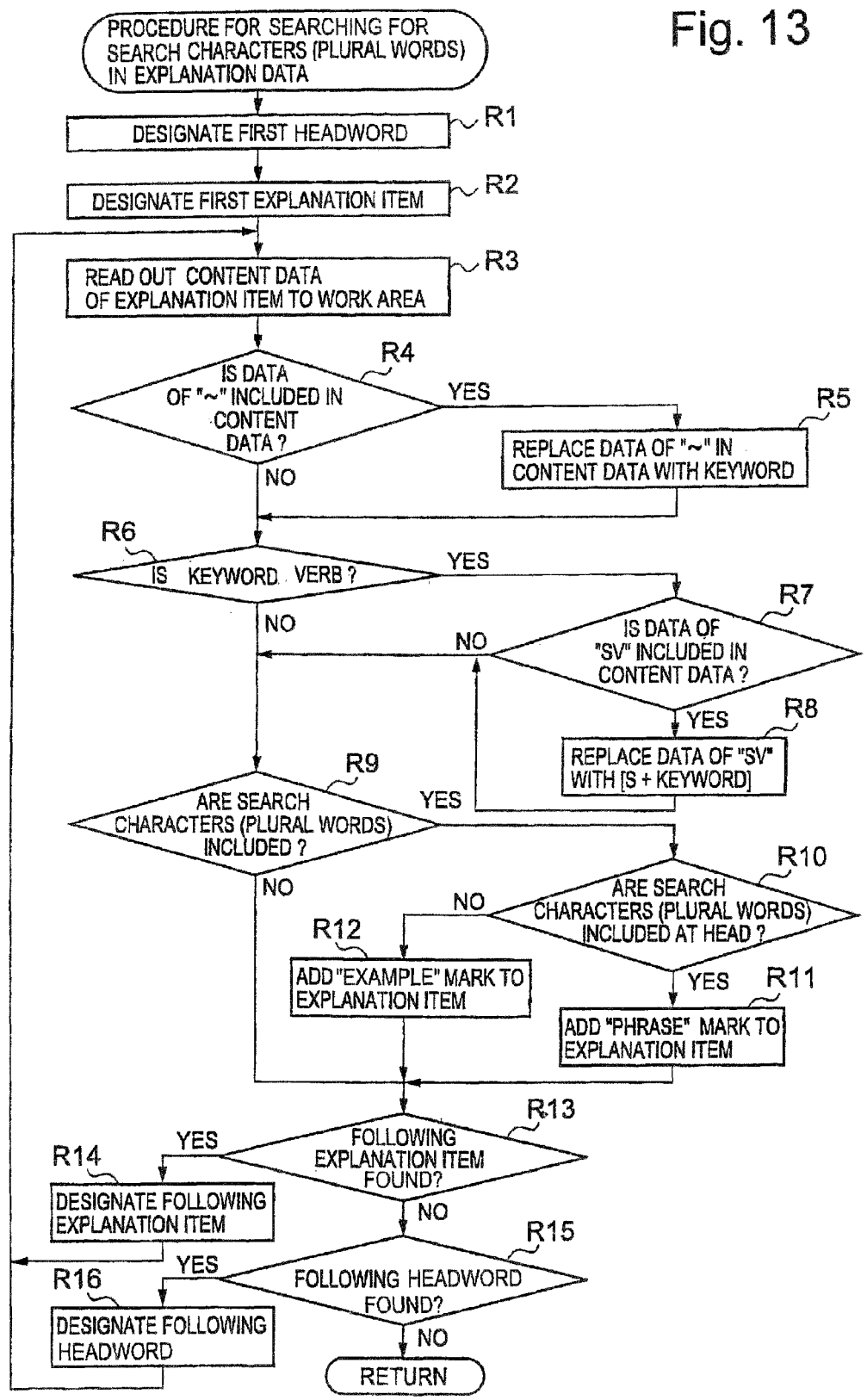
FIG. 13 is a flowchart of a plural-word search procedure performed in the information displaying procedure of the communication electronic-dictionary 10. In the plural-word search procedure, plural words are searched for through the explanation data.

Then, the procedure advances to a plural-word search procedure shown in FIG. 13 at Step PB, in which plural words are searched for in the explanation data. In the plural-word search procedure at Step PB, as shown in FIG. 13, when the first appearing headword "kind1" is designated among the plural headwords "kind1", "kind2", etc., stored in the search headword list memory 12f, at Step R1 shown in FIG. 13, the first explanation item is designated among the explanation contents (items) corresponding to the designated headword at Step R2. Content data of the designated explanation item is read out to the work area 12j at Step R3, and it is judged at Step R4 whether data of "~" is contained in the content data of the designated explanation item or not. When it is determined that data of "~" is contained in the content data of the designated explanation item, data of "~" is replaced with the keyword "kind" at Step R5.

It is judged at Step R6 whether the designated keyword is a verb, and when it is determined that the keyword is a verb, it is judged at Step R7 whether a mark data of "SV" is contained in the content data of the designated explanation item or not. When it is determined that the mark data of "SV" is contained in the content data of the designated explanation item, the mark data of "SV" is replaced with data of [S+the keyword "kind"] at Step R8.

As described above, if data of "~" is contained in the content data of the designated explanation item of the designated headword, data of "~" is replaced with the keyword "kind", and if the designated keyword is a verb and the mark data of "SV" is contained in the content data of the designated explanation item, the mark data of "SV" is replaced with data of [S+the keyword "kind"]. Then, it is judged at Step R9 whether or not the explanation content, whose data has been replaced as described above, coincides with or includes the search character string consisting of plural words, that is, "kind to". For example, when the content data of the designated explanation item whose data of "~" has been replaced with the keyword "kind" becomes a character string starting with "kind to", it is determined that the content data coincides with or includes the search character string "kind to". Then, it is judged at Step R10 whether the explanation content begins with the search character string "kind to" or not.

When it is determined that the content data of the designated explanation item coincides with or includes the search character string and that the content data begins with the search character string, a mark (a flag) and a "phrase" mark are set or added to the index number of the content data and the corresponding explanation number in the correspondence-data table 12g (FIG. 4) at Step R11. The flag represents that the explanation content coincides with or includes the search character string and the "phrase" mark represents that the explanation content explains the phrase.

When it is determined that the content data of the designated explanation item contains a character string which coincides with or includes the search character string, and that the explanation content does not include the character string at the beginning of the explanation but rather in the middle thereof, a mark (a flag) and an "example" mark are set or added to the index number of the content data and the corresponding explanation number in the correspondence-data table 12g (FIG. 4) at Step R12. The flag represents that the explanation content coincides with or includes the search character string and the "example" mark represents that the explanation content explains an example sentence.

When it is determined at Step R9 that the content data of the designated explanation item with data of "~" replaced with the keyword or with a symbol data of "SV" replaced with [S+the keyword] neither coincides with nor includes the search character string consisting of plural words, or after Step R11 or Step R12 has been performed, it is judged at Step R13 whether or not there is a next explanation item in the explanation content of the designated headword "kind1".

When it is determined that there is a following explanation item, the following explanation item is designated at Step R14, and the procedure returns to the process at Step R3, such that Step R3 through Step R11 or Step R12 are performed for the newly designated explanation item.

As described above, with respect to the first headword "kind1," which is found in the headword search for searching for the search character string consisting of plural words ("kind to") and stored in the search headword list memory 12f, it is judged whether or not the corresponding explanation item with the data of replaced with the keyword "kind" and with the symbol data of "SV" replaced with [S+the keyword] coincides with the search character string of "kind to". When the corresponding explanation item coincides with or includes the search character string, the "phrase" mark or the "example" mark is set to the corresponding index number of the explanation item and the explanation number. Then, it is determined at Step R15 if there is a following headword. If there is a following headword, the following headword "kind2" stored in the search headword list memory 12f is designated at Step R16.

With respect to the second headword "kind2," which is found in the headword search for searching for the search character string consisting of plural words ("kind to") and is stored in the search headword list memory 12f, it is judged whether or not the corresponding explanation item with the data of "~" replaced with the keyword "kind" and with the symbol data of "SV" replaced with [S+the keyword] coincides with the search character string "kind to". When the corresponding explanation item coincides with or includes the search character string, the "phrase" mark or the "example" mark is set to the corresponding index number of the explanation item and the explanation number. (Step R3 through Step R14).

When the procedure has been performed with respect to all of the headwords found in the headword search, it is judged at Step P5 whether or not a headword whose content data completely includes the search character string consisting of plural words has been found in the English-Japanese dictionary data stored in the dictionary-content data memory 12d.

When the headword whose content data completely includes the search character string consisting of plural words has not been found in the English-Japanese dictionary data stored in the dictionary-content data memory 12d, another word is selected and designated as a new keyword from among the plural words included in the search character string at Step P6. With respect to the new keyword, a search procedure is performed at Step P7, for searching for headwords coinciding with the new keyword. The explanation content data of the found headwords are read out from the dictionary data at Step P8. Further, it is judged at Step PB whether the search character string consisting of plural words is included in content data of each of the explanation items corresponding to the headwords. Step P7, Step P8 and Step PB are thus performed in a similar manner to Step P3, Step P4, and Step PB.

As described above, when a headword whose explanation content (item) includes a search character string consisting of plural words is found in the English-Japanese dictionary, the flag representing that the search character string is contained in the explanation item of the found headword, and the "phrase" mark representing that the explanation item explains a phrase or the "example" mark representing that the explanation item includes an example sentence, are associated with the explanation item of the headword. Then, the search character string consisting of plural words ("kind to" in this example) is searched through phrase-headwords in an English-Japanese phrase dictionary data stored in the dictionary-content data memory 12d, and the searched phrase-headwords coincident with the search character string "kind to" are stored in the search headword list memory 12f at Step P9, and the explanation content data of each of the found phrase-headwords are read out at Step P10.

Then, with respect to headwords found in the English-Japanese dictionary stored in the search headword list memory 12f, the search headwords 131a, 131b, etc., and explanation contents (heading data each including the search character string consisting of plural words) 136a, 136b, 136c, etc., of each of the search headwords 131a, 131b, etc. are displayed on the search headword list display screen G4 of the display device 18. The displayed explanation contents each includes the search character string consisting of plural words and bears the "example" mark 137a or the "phrase" mark 137b in accordance with the flags in the correspondence-data table 12g. See, for example, FIG. 15B, FIG. 17B, and FIG. 20A. Further, with respect to the English-Japanese phrase dictionary, the phrase-headwords (for example, 131c in FIGS. 19A, 19B and 19C and 131b in FIG. 21B) and the explanation contents 136a, 136b, etc., of each of the phrase-headwords (which are designated by a phrase mark 137d) are displayed on the search headword list display screen G4 of the display device 18. See step P11 in FIG. 10. See also FIG. 19B and FIG. 21B.

Figure 15B:
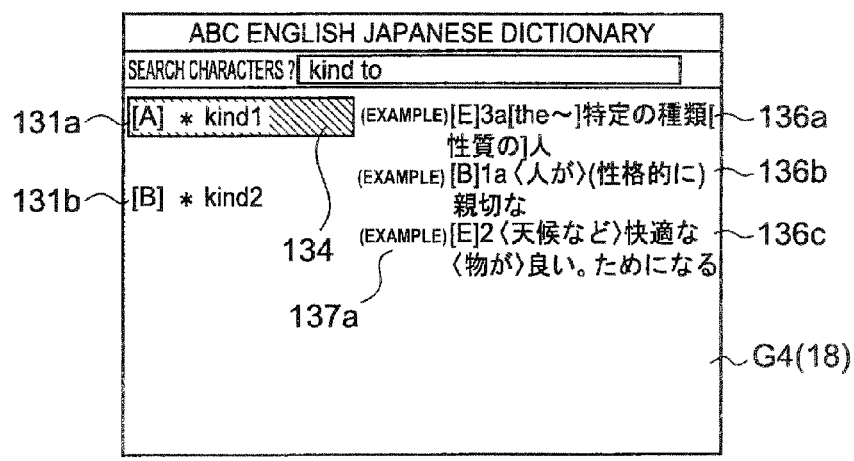
Figure 16A:
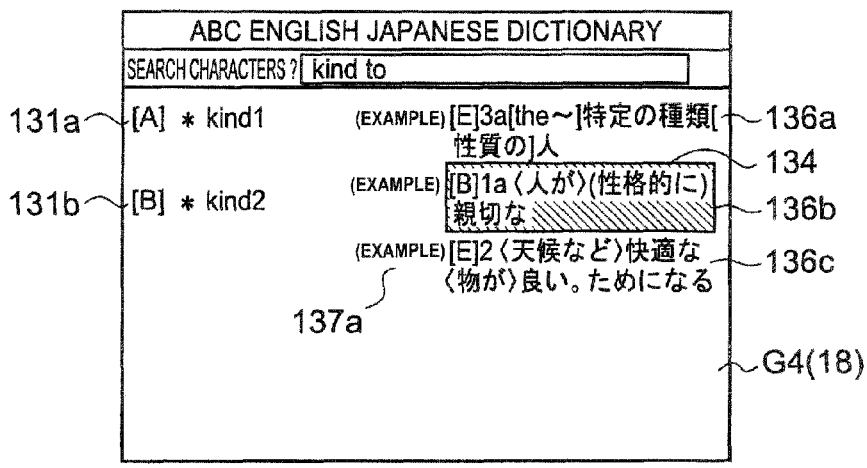
FIGS. 16A and 16B are views illustrating examples of display screens displayed when a search character string consisting of plural words is input in the information displaying procedure performed in the dictionary search operation of the communication electronic-dictionary 10.
Figure 17A:
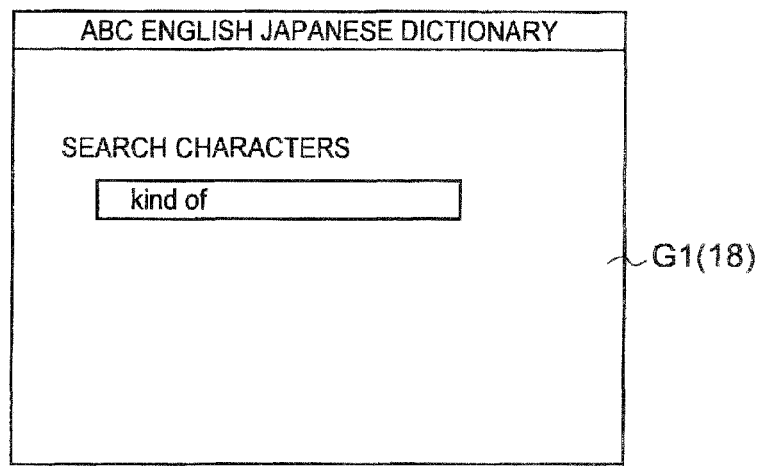
FIGS. 17A and 17B are views illustrating examples of display screens displayed when a search character string consisting of plural words is input in the information displaying procedure performed in the dictionary search operation of the communication electronic-dictionary 10.
Figure 17B:
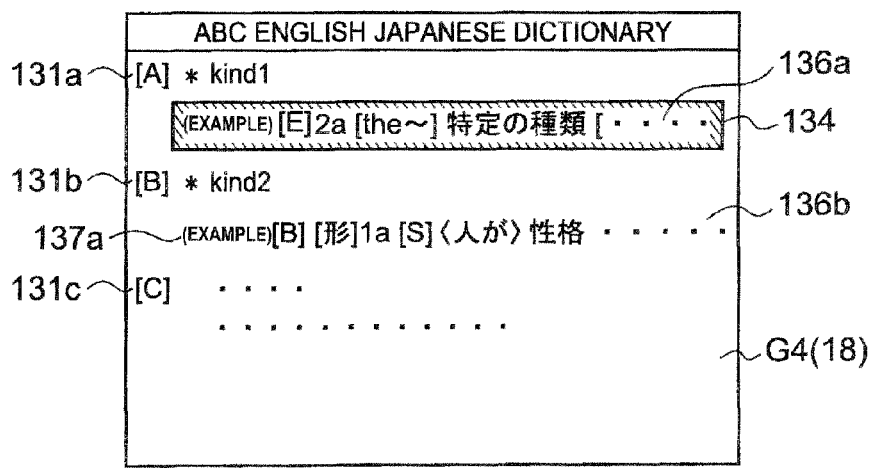
Figure 18A:
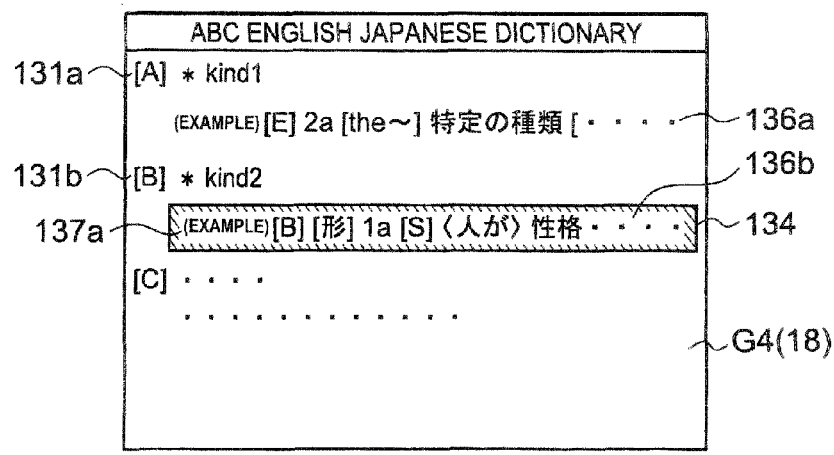
FIGS. 18A and 18B are views illustrating examples of display screens displayed when a search character string consisting of plural words is input in the information displaying procedure performed in the dictionary search operation of the communication electronic-dictionary 10.

The search headword list display screen G4 shown in FIG. 15B and FIG. 16A, the search headword list display screen G4 shown in FIG. 17B and FIG. 18A, and the search headword list display screen G4 shown in FIG. 20 illustrate the search headwords 131a, 131b, etc., and explanation contents (heading data each including the search character string consisting of plural words, with the "example" mark 137a or the "phrase" mark 137b added) 136a, 136b, etc., of each of the search headwords 131a, 131b, etc., which are to be displayed when the search character string has been searched for through the English-Japanese dictionary.

Figure 19A:
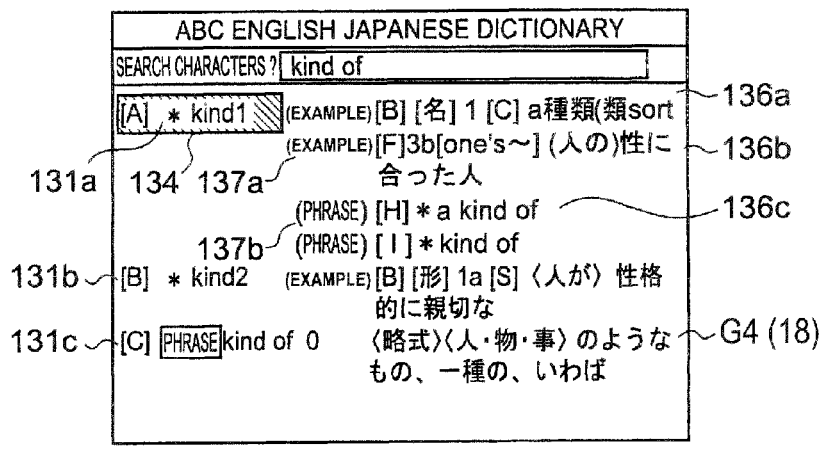
FIGS. 19A, 19B and 19C are views illustrating examples of display screens displayed when a search character string consisting of plural words is input in the information displaying procedure performed in the dictionary search operation of the communication electronic-dictionary 10.
Figure 19B:
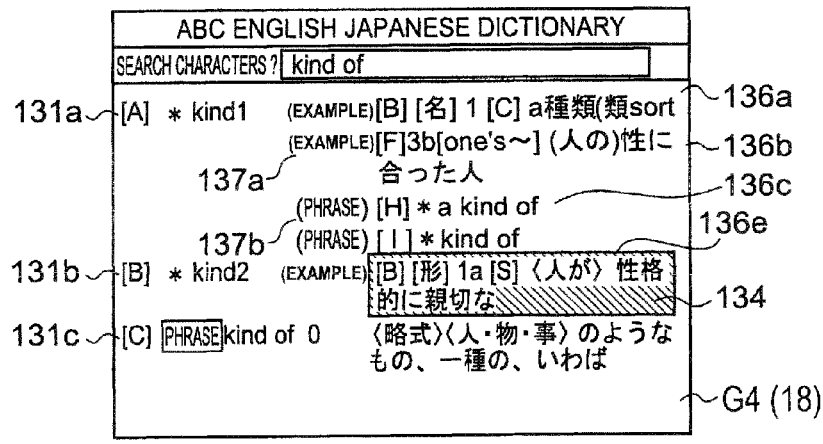
Figure 21A:
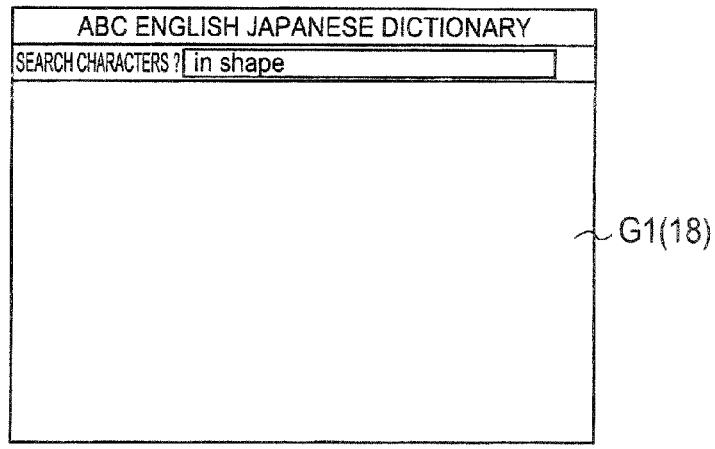
FIGS. 21A and 21B are views illustrating examples of display screens displayed when a search character string consisting of plural words is input in the information displaying procedure performed in the dictionary search operation of the communication electronic-dictionary 10.
Figure 21B:
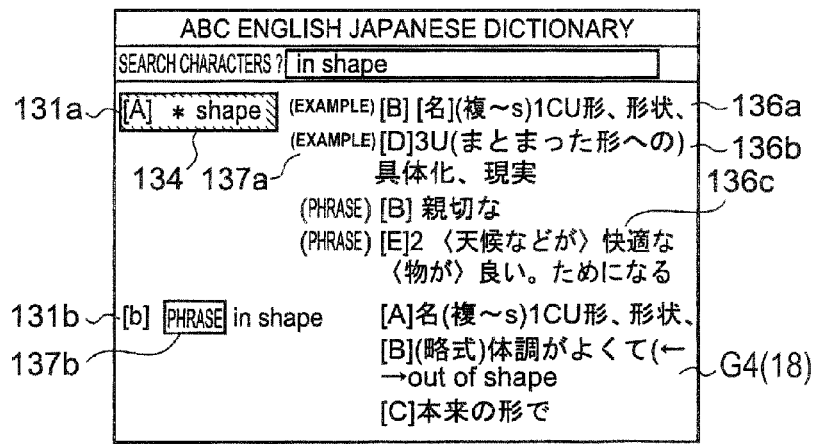

The search headword list display screen G4 shown in FIG. 19A and FIG. 19B and the search headword list display screen G4 shown in FIG. 21B illustrate the search headwords 131a, 131b, etc., and explanation contents (heading data each including the search character string consisting of plural words, with the "example" mark 137a or the "phrase" mark 137b added) 136a, 136b, etc., of each of the search headwords 131a, 131b, etc., which are to be displayed when the keyword has been searched for through the English-Japanese dictionary and the search phrase-headwords 131a, 131b, etc., and explanation contents (with the "example" mark 137a or the "phrase" mark 137b added) 136a, 136b, etc., of each of the search phrase-headwords 131a, 131b, etc., which are to be displayed when the search character string (phrase) has been searched for through the English-Japanese phrase dictionary.

As described above, the search headword list display screen G4 is generated and displayed at step P11. The first appearing headword 131a among the plural headwords 131a, 131b, etc., is designated as the default headword and highlighted as shown at 134 in, for example, FIG. 15B at Step P12, or the explanation content 136a of the designated headword 131a is highlighted as shown at 134 in, for example, FIG. 17B at Step P13.

When it is determined at Step P15 that the designated headword is changed among the plural headwords 131a, 131b, etc., displayed on the left area of the search headword list display screen G4 by moving the cursor by a user's manipulation of the input unit 17 (Step P14), the procedure returns to the process at Step P13, where the newly designated headword or the corresponding explanation content is highlighted and the apparatus is brought into a state of waiting for the user's manipulation. On the other hand, when it is determined at Step P16 that the cursor has been moved at Step P14 from one heading data to another among the heading data 136a, 136b, etc., of the plural explanation items displayed on the search headword list display screen G4, the heading data to which the cursor is moved is highlighted at Step P17.

When the "translation/determination" key of the input unit 17 is manipulated at Step P18 with the highlighted headword 131a (such as "look" in FIG. 20A) selected on the search headword list display screen G4, the explanation contents 136a for the selected headword 131a ("look") stored in the dictionary-content data memory 12d are successively read out from the content data of the first explanation item and displayed on the display device 18 as the explanation-content display screen G5 (see, for example FIG. 20B) at Step P19.

When it is determined at step P20 that any of the content data of the explanation items 136a, 136b, etc., corresponding to the designated headword 131a displayed on the explanation-content display screen G5 includes the search character string consisting of plural words, (such as "look at"), or that any of the content data of the explanation items 136a, 136b, etc., in which data of "~" or data of "SV" is replaced with the keyword (e.g., "look") in accordance with the flag or setting data given in the correspondence-data table 12g, includes the search character string consisting of plural words, "look at", a block of data in the content data including the search character string consisting of plural words, for example, a block of data of "SV at O" (FIG. 20B) is highlighted at 138 or is displayed in another color, in bold, or in other font at Step P21.

Meanwhile, when the "translation/determination" key is manipulated at Step P22 with an explanation item selected with the cursor and highlighted at 134 (see FIG. 16A, for example), the explanation contents of the explanation item stored in the dictionary-content data memory 12d are successively read out and displayed on the display device 18 as the explanation-content display screen G5 at Step P23. When it is determined at step P20 that the search character string consisting of plural words (such as "kind to" or "kind of") is included in content data of the explanation item displayed on the explanation-content display screen G5 or that the search character string consisting of plural words is included in content data of the explanation item in which data of "~" or data of "SV" is replaced with the keyword "kind" in accordance with the flag or the setting data given in the correspondence-data table 12g, a block of data in the content data including the search character string is highlighted at 138 or is displayed in another color, in bold, or in other font at Step P21.

For instance, in the example shown in FIG. 15A and FIG. 15B, and in the example shown in FIG. 17A and FIG. 17B, when a search character string consisting of plural words (e.g., "kind to") is entered on the search-word input screen G1 and the "translation/determination" key of the input unit 17 is manipulated, a dictionary search procedure is performed with respect to a keyword, "kind", which is selected and designated as the keyword. Content data of explanation items including the search character string consisting of "kind to" are identified in explanation contents of plural headwords which coincide with the search keyword "kind". If one or more of the corresponding headwords "kind1" 131a, "kind2" 131b, etc., and their heading data 136a, 136b, etc., include an example sentence, the "example" mark is added thereto and displayed on the search headword list display screen G4. If one or more of the corresponding headwords "kind1" 131a, "kind2" 131b, etc., and the heading data 136a, 136b, etc., explain phrases, the "phrase" mark is added thereto and displayed on the search headword list display screen G4.

Figure 16B:
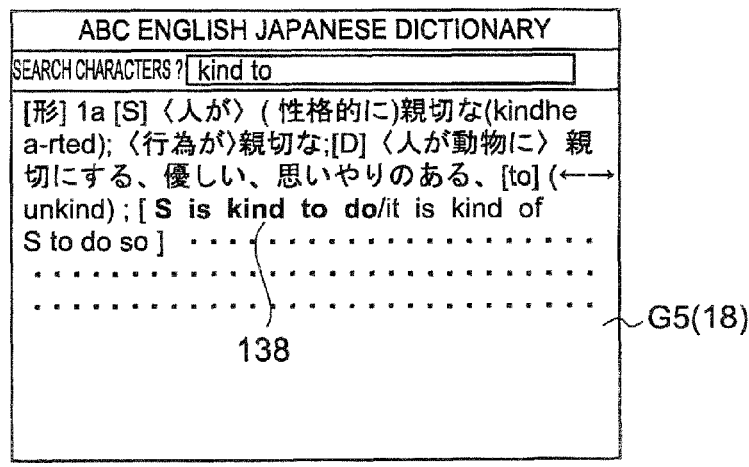
Figure 18B:
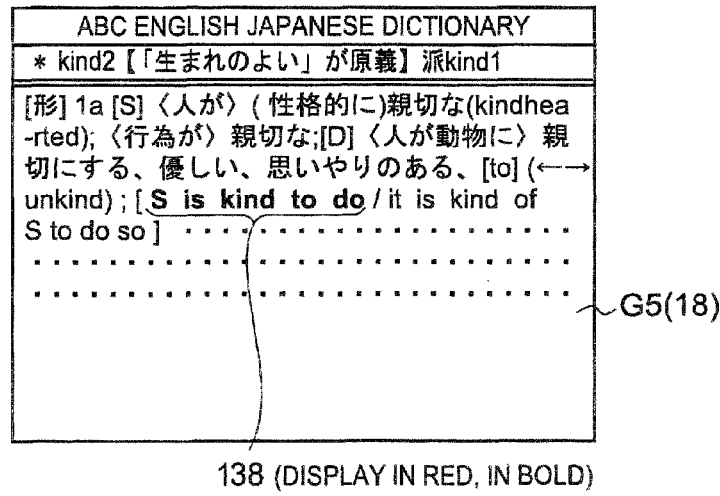

As shown in FIG. 16A and FIG. 16B or in FIG. 18A and FIG. 18B, when a desired explanation item 136b for the desired headword "kind2" 131b is designated and highlighted by manipulating the cursor on the search headword list display screen G4 and the "translation/determination" key of the input unit 17 is manipulated, the whole content data for the designated explanation item 136b and the following items are read out and displayed as the explanation-content display screen G5.

On the explanation-content display screen G5, a block of data ("S is kind to do") including the search character string consisting of plural words ("kind to") is highlighted or displayed in another color, in bold, or in another font, and therefore the user can easily find an explanation portion for the entered search character string consisting of plural words ("kind to").

As illustrated in FIG. 19A, when a search character string consisting of plural words ("kind of") is entered on the search-word input screen G1 and the "translation/determination" key of the input unit 17 is manipulated, the dictionary search procedure is performed in the dictionary with respect to the keyword "kind", and the dictionary search procedure is performed in the phrase dictionary with respect to a phrase corresponding to the plural words ("kind of"). Content data explaining the search character string consisting of plural words ("kind of") is identified in the explanation contents for the headwords which coincide with the keyword "kind", and the corresponding headwords "kind1" 131a, "kind2" 131b, etc., and their heading data 136a, 136b, etc., with the "example" mark and the "phrase" mark added are displayed on the search-headword list screen display G4. The headword "kind of O" 131c and its explanation content with the "phrase" mark added are displayed on the same search headword list screen display G4.

Figure 19C:
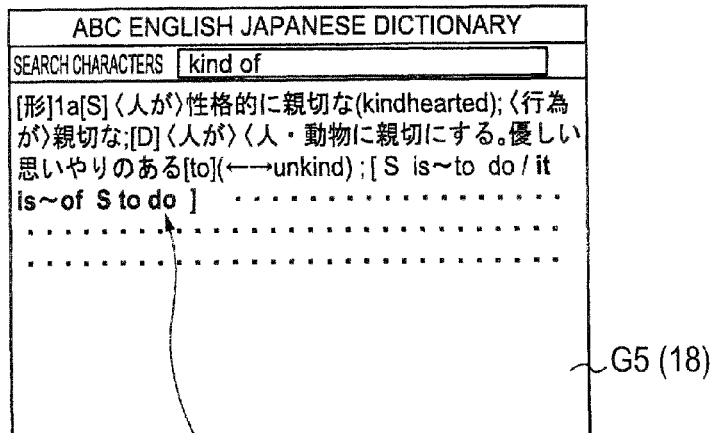

As shown in FIG. 19B and FIG. 19C, when the desired explanation item 136e corresponding to the desired headword "kind2" 131b is highlighted on the search headword list display screen G4 by manipulation of the cursor key, and the "translation/determination" key of the input unit 17 is manipulated, the whole content data for the designated explanation item 136e and the following items are read out and displayed as the explanation-content display screen G5.

When it is determined that the search character string consisting of plural words ("kind of") is included in the explanation content data displayed on the explanation-content display screen G5, in which data of "~" is replaced with the keyword "kind", a block of data in the explanation content data including "it is ~ of S to do" is displayed at 138 in another color, in bold, or in another font, and therefore the user can easily find an explanation portion for the entered search character string consisting of plural words "kind of".

The content data "it is ~ of S to do" of the explanation item including the search character string consisting of plural words ("kind of") may be displayed as the content data "it is kind of S to do" in which data of "~" is replaced with the keyword "kind" for easy searching and clear understanding.

Figure 20A:
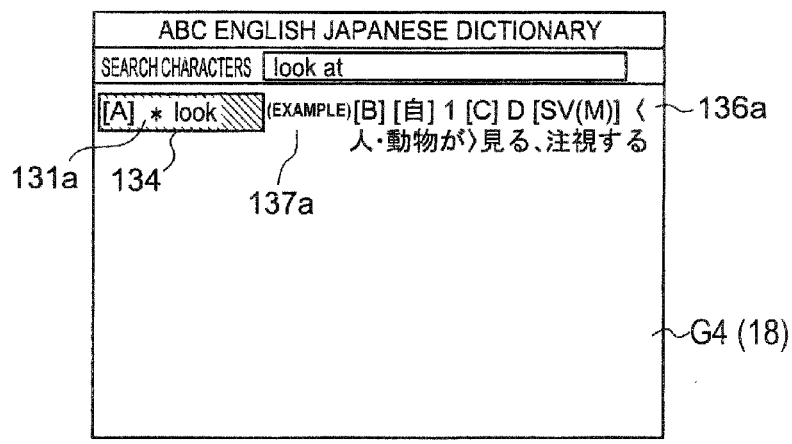
FIGS. 20A and 20B are views illustrating examples of display screens displayed when a search character string consisting of plural words is input in the information displaying procedure performed in the dictionary search operation of the communication electronic-dictionary 10.
Figure 20B:
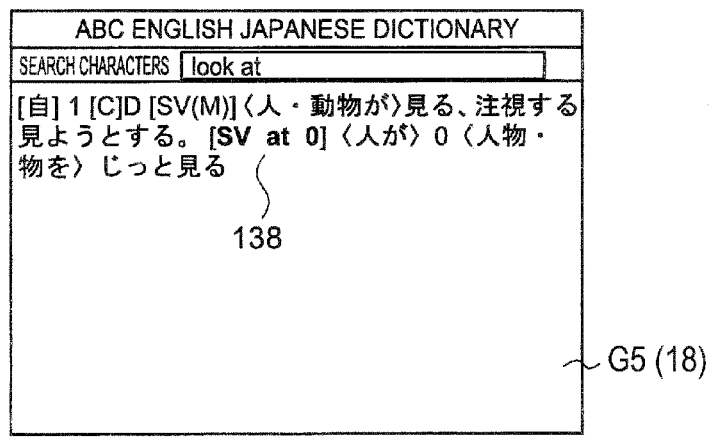

As illustrated in the example shown in FIG. 20A and FIG. 20B, when a search character string consisting of plural words ("look at") is entered and the "translation/determination" key of the input unit 17 is manipulated, the dictionary search procedure is performed with respect to the designated keyword "look". Content data of the explanation item explaining the search character string consisting of plural words ("look at") is identified in the explanation contents for the headwords which coincide with the keyword "look", and the corresponding headword "look" 131a, and its heading data 136a included in the explanation item with the "example" mark or the "phrase" mark added are displayed on the search headword list screen display G4.

When the "translation/determination" key of the input unit 17 is manipulated with the first headword 131a designated and highlighted at 134 as the default word among the searched headwords on the search headword list display screen G4, the whole content data of the explanation item 136a corresponding to the designated headword "look" are read out and displayed as the explanation-content display screen G5.

When it is determined that the search character string consisting of plural words ("look at") is included in the explanation content data displayed on the explanation-content display screen G5, in which data of "~" and data of "SV" is replaced with the keyword "look" and "S+look" respectively, a block of data in the explanation content data including "SV at O" is displayed at 138 in another color, in bold, or in another font, and therefore the user can easily find an explanation portion for the entered search character string consisting of plural words ("look at").

The content data, "SV at O", of the explanation item including the search character string consisting of plural words ("look at") may be displayed as the content data "S V=look at O" in which "V" in data of "SV" is replaced with the keyword "look" for easy searching and clear understanding.

Further, as illustrated in the example shown FIG. 21A and FIG. 21B, when a search character string consisting of plural words ("in shape") is entered in the search-word input screen G1 and the "translation/determination" key of the input unit 17 is manipulated, the dictionary search procedure is performed with respect to a keyword "shape", which is selected and designated as the keyword, and the dictionary search procedure is performed with respect to the phrase "in shape". Content data of explanation items including the search character string consisting of plural words "in shape" are identified in explanation contents of plural headwords which coincide with the search keyword "shape".

The corresponding headword "shape" 131a and its heading data 136a, 136b, etc., of the explanation items with the "example" mark or "phrase" mark added are displayed in a list on the search headword list display screen G4, and the searched words "in shape" 131b and their explanation content with the "phrase" mark added are displayed in the list on the same search-headword list screen display G4.

As described above, with respect to the search character string consisting of plural words, the headword and its explanation content explaining the search keyword are displayed together with the "example" mark and/or the "phrase" mark for easy searching.

In the information displaying apparatus (communication electronic-dictionary) 10 of the configuration set forth above, when a search character string consisting of plural words is entered, a verb, an adjective or a noun in the entered words is set as a keyword, and plural headwords which coincide with the keyword are searched for from the English-Japanese dictionary, and explanation contents of the found headwords are read out. Then, it is judged whether or not the read out explanation contents include the search character string consisting of plural words, or it is judged whether or not the read out explanation contents with data of "~" replaced with the keyword and data of "SV" replaced with "S+the keyword" include the search character string consisting of plural words. The explanation contents 136a, 136b, etc., including the search character string consisting of plural words and their headwords 131a, 131b, etc., are displayed in a list on the search headword list display screen G4. When a desired explanation content is designated, the whole data of the designated explanation content is displayed on the explanation-content display screen G5. Therefore, even if the search character string consists of a phrase or a semi-phrase including plural words or a noun+ a preposition, the corresponding headword and the explanation contents may be searched for and displayed.

Further, in the information displaying apparatus (communication electronic-dictionary) 10 of the configuration set forth above, explanation contents which include the search character string including plural words are searched for. The headwords 131a, 131b, etc., corresponding to the found explanation contents and the heading data 136a, 136b, etc., included in the found explanation contents are associated with each other and displayed on the left area and the right area of the search headword list display screen G4, respectively. The user can instantly find the headword including the search character string and the explanation content on the search headword list display screen G4.

Still further, in the information displaying apparatus (communication electronic-dictionary) 10 of the configuration set forth above, a verb, an adjective or a noun contained in the search character string consisting of plural words may be chosen as a keyword to be searched for. If the explanation contents of the found headword do not include the search character string consisting of plural words, another word in the search character string is chosen as the keyword and the explanation contents that include the search character string consisting of plural words and their headword may be searched for and displayed without failure.

In the information displaying apparatus (communication electronic-dictionary) 10 of the configuration set forth above, a headword that coincides with the search character string consisting of plural words is searched for in a phrase dictionary, and the found headword and its explanation contents with the "phrase" mark added are displayed on the search headword list display screen G4. A headword including plural words may be searched for in an English-Japanese dictionary and a phrase dictionary, wherein a simple and more detailed headword and its explanation contents may be found and displayed.

Further, in the information displaying apparatus (communication electronic-dictionary) 10 of the configuration set forth above, if the explanation contents corresponding to the found headword include data of "~", the data of "~" is replaced with the keyword. Since it is judged whether or not the search character string consisting of plural words is included in the explanation contents, or whether or not the search character string consisting of plural words is included in the explanation contents with data of "~" replaced with the keyword, the headword having an explanation of the search character string consisting of plural words may be searched for even in the data base of the English-Japanese dictionary without failure.

Still further, in the information displaying apparatus (communication electronic-dictionary) 10 of the configuration set forth above, if the explanation contents corresponding to the searched headword include data of "SV", the data of "SV" is replaced with "S+keyword". Since it is judged whether or not the search character string consisting of plural words is included in the explanation contents, or whether or not the search character string consisting of plural words is included in the explanation contents with data of "SV" replaced with "S+keyword", the headword having an explanation of the search character string consisting of plural words may be searched for even in the data base of the English-Japanese dictionary without failure.

In the information displaying apparatus (communication electronic-dictionary) 10 of the configuration set forth above, if the content data of the explanation items 136*a*, 163*b*, etc., include the search character string including a phrase consisting of plural words, the search character string portion in the content data is highlighted at 138 or displayed in another color, in bold, or in another font on the explanation-content display screen G5. Therefore, the user can find the search character string portion on the explanation-content display screen G5.

In the information displaying apparatus (communication electronic-dictionary) 10 of the configuration set forth above, the headwords having content data including a search character string consisting of plural words are displayed on the left area of the search headword list display screen G4 on the display device 18 and the heading data of the explanation contents are displayed on the right area of the search headword list display screen G4. If the explanation contents include the search character string as an example sentence, the "example" mark is added to the explanation contents. If the explanation contents include or explain the search character string as a phrase, the "phrase" mark is added to the explanation contents. Therefore, the user can easily find desired explanation contents on the search headword list display screen G4.

Figure 11:
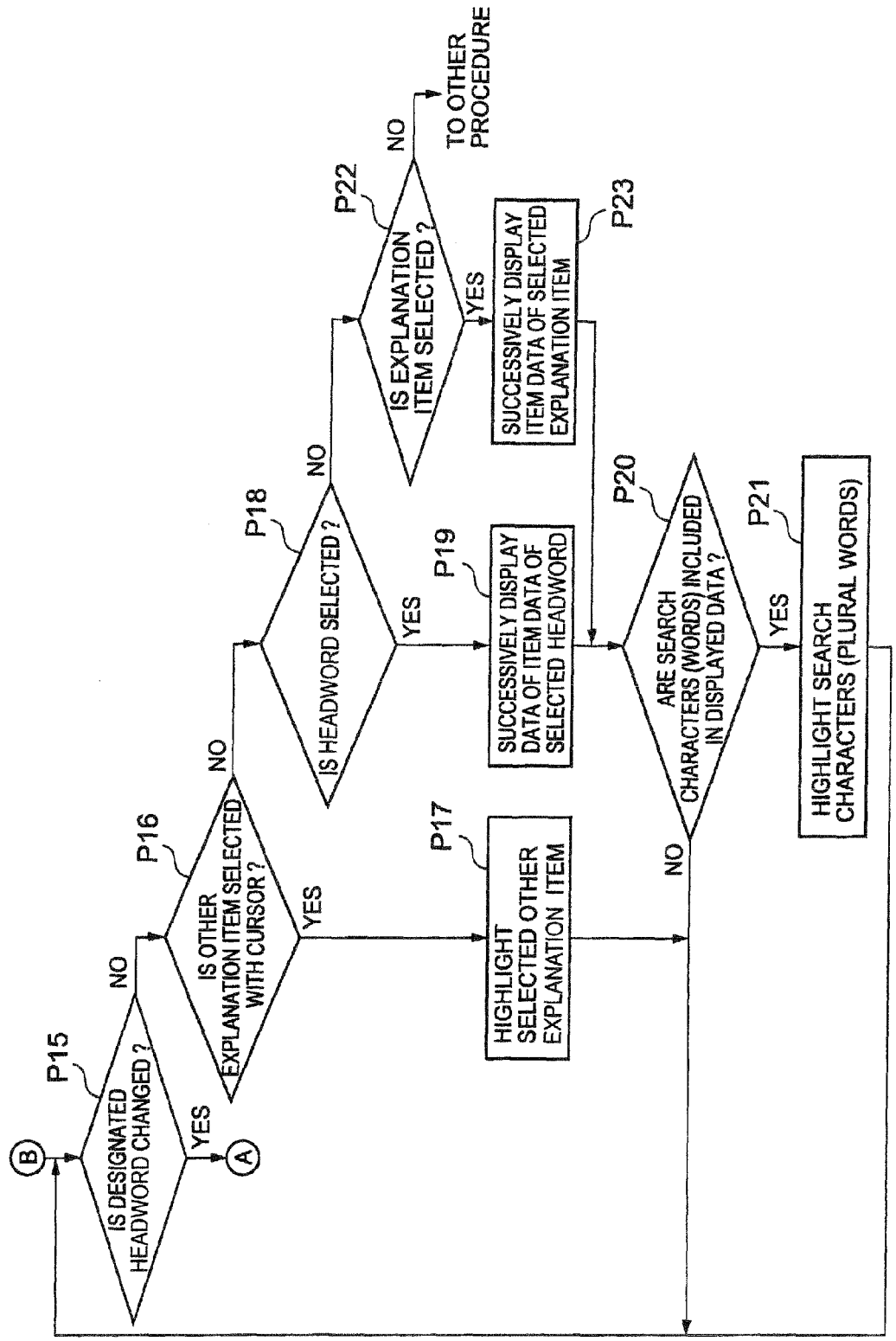
FIG. 11 is a continuation of the flowchart of FIG. 10.

The information displaying procedure in the dictionary search operation performed in the information displaying apparatus (communication electronic-dictionary) 10 in accordance with the flow charts shown in FIG. 10 and FIG. 11 may be performed by a computer under program instructions. The program may be stored and distributed in an external storage 13 such as a memory card (ROM card, RAM card, etc.), a magnetic disc (floppy disc, hard disc, etc.), an optical memory disc (CD-ROM, DVD, etc.), or a semiconductor memory. Similarly, the keyword selecting procedure in the information display procedure performed in accordance with the flow chart shown in FIG. 12 and the plural word searching procedure in the information displaying procedure performed in accordance with the flow chart shown in FIG. 13 may be performed by the computer under program instructions. The program may be stored and distributed in an external storage 13 such as a memory card (ROM card, RAM card, etc.), a magnetic disc (floppy disc, hard disc, etc.), an optical memory disc (CD-ROM, DVD, etc.), or a semiconductor memory. Meanwhile, a computer terminal with a function of communicating with the Internet network reads the program stored in the external storage 13 into its own recording device 14, and performs the similar information display procedure in the dictionary search operation under the instructions of the program.

Program codes of the program may be transferred over the Internet network, and the computer terminal connected to the Internet network can read in the program codes and therefore the information display procedure in the dictionary search may be performed by the computer terminal.

Further modification and variation can be made to the disclosed embodiments without departing from the subject and spirit of the invention as defined in the following claims. Such modification and variations, as included within the scope of these claims, are meant to be considered part of the invention as described.

What is claimed is:

1. A device comprising:
an information storage device that stores entry words and information on each of the entry words;
an input unit for inputting a series of words;
a judgment unit that judges whether or not any word contained in the inputted series of words is a verb, an adjective, or a noun;
a keyword retrieval unit that sets as a keyword a word in the inputted series of words that is judged to be a verb, an adjective, or a noun, and retrieves each entry word that corresponds to the keyword from the information storage device;
a series-of-words information extraction unit that selectively extracts, from the information stored in the information storage device on each retrieved entry word, each item of information that contains all of the inputted series of words;
a series-of-words information display unit that displays each extracted item of information containing all of the inputted series of words in association with the entry word corresponding to the extracted item of information; and
a series-of-words identification unit which adds an example mark or a phrase mark to each item of information that is extracted by the series-of-words information extraction unit comprising a block of the item of information and the inputted series of words;
wherein the series-of-words information extraction unit replaces placeholder data in the information on each retrieved entry word, with the keyword, and selectively extracts each item of information that contains all of the inputted series of words after the placeholder data is replaced with the keyword; and wherein the series-of-words information display unit displays each extracted item of information together with the example mark or phrase mark added thereto.

2. The device according to claim 1, wherein the keyword retrieval unit includes a longest noun keyword setting unit that sets a longest noun as the keyword, when the judgment unit judges that the inputted series of words contains a plurality of nouns.

3. The device according to claim 1, wherein when the judging unit judges that inputted series of words contains a verb, the keyword retrieval unit sets the verb as the keyword.

4. The device according to claim 3, wherein when the judging unit judges that inputted series of words contains an adjective but no verb, the keyword retrieval unit sets the adjective as the keyword.

5. The device according to claim 4, wherein when the judging unit judges that inputted series of words contains a noun but no adjective or verb, the keyword retrieval unit sets the noun as the keyword.

6. The device according to claim 4, wherein when the judging unit judges that inputted series of words contains a plurality of nouns but no adjective or verb, the keyword retrieval unit sets a longest noun in the inputted series of words as the keyword.

7. The device according to claim 1, wherein the series-of-words information display unit displays each extracted item of information in a list.

8. A non-transitory computer-readable recording medium having a program stored thereon that is executable to control a computer of a device that includes a display, an input unit, and an information storage device that stores entry words and information on each of the entry words, the program controlling the computer to function as units comprising:

a judgment unit that judges whether or not any word contained in a series of words inputted via the input unit is a verb, an adjective, or a noun;

a keyword retrieval unit that sets as a keyword a word in the inputted series of words that is judged to be a verb, an adjective, or a noun, and retrieves each entry word that corresponds to the keyword from the information storage device;

a series-of-words information extraction unit that selectively extracts, from the information stored in the information storage device on each retrieved entry word, each item of information that contains all of the inputted series of words;

a series-of-words information display unit that displays each extracted item of information containing all of the inputted series of words in association with the entry word corresponding to the extracted item of information; and a series-of-words identification unit which adds an example mark or a phrase mark to each item of information that is extracted by the series-of-words information extraction unit comprising a block of the item of information and the inputted series of words;

wherein the series-of-words information extraction unit replaces placeholder data in the information on each retrieved entry word, with the keyword, and selectively extracts each item of information that contains all of the inputted series of words after the placeholder data is replaced with the keyword; and wherein the series-of-words information display unit displays each extracted item of information together with the example mark or phrase mark added thereto.

9. The non-transitory computer-readable recording medium according to claim 8, wherein the keyword retrieval unit includes a longest noun keyword setting unit that sets a longest noun as the keyword, when the judgment unit judges that the inputted series of words contains a plurality of nouns.

10. The non-transitory computer-readable recording medium according to claim 8, wherein when the judging unit judges that inputted series of words contains a verb, the keyword retrieval unit sets the verb as the keyword.

11. The non-transitory computer-readable recording medium according to claim 10, wherein when the judging unit judges that inputted series of words contains an adjective but no verb, the keyword retrieval unit sets the adjective as the keyword.

12. The non-transitory computer-readable recording medium according to claim 11, wherein when the judging unit judges that inputted series of words contains a noun but no adjective or verb, the keyword retrieval unit sets the noun as the keyword.

13. The non-transitory computer-readable recording medium according to claim 11, wherein when the judging unit judges that inputted series of words contains a plurality of nouns but no adjective or verb, the keyword retrieval unit sets a longest noun in the inputted series of words as the keyword.

14. The non-transitory computer-readable recording medium according to claim 8, wherein the series-of-words information display unit displays each extracted item of information in a list.

* * * * *